US008523385B2

United States Patent
Lu et al.

(10) Patent No.: US 8,523,385 B2
(45) Date of Patent: *Sep. 3, 2013

(54) COMPACT HIGH BRIGHTNESS LED GROW LIGHT APPARATUS, USING AN EXTENDED POINT SOURCE LED ARRAY WITH LIGHT EMITTING DIODES

(75) Inventors: Junying Jonathan Lu, Castro Valley, CA (US); Brian I-Yuan Chiang, El Sobrante, CA (US); Ho-Shang Lee, El Sobrante, CA (US)

(73) Assignee: DiCon Fibêroptics Inc., Richmond, CA (US)

( * ) Notice: Subject to any disclaimer, the term of this patent is extended or adjusted under 35 U.S.C. 154(b) by 233 days.

This patent is subject to a terminal disclaimer.

(21) Appl. No.: 12/860,760

(22) Filed: Aug. 20, 2010

(65) Prior Publication Data

US 2012/0043907 A1    Feb. 23, 2012

(51) Int. Cl.

| F21V 9/16 | (2006.01) |
| F21V 13/04 | (2006.01) |
| F21V 21/00 | (2006.01) |
| F21S 4/00 | (2006.01) |

(52) U.S. Cl.
USPC ............. 362/231; 362/2; 362/245; 362/247; 362/249.02; 362/805

(58) Field of Classification Search
USPC ................. 362/1, 2, 230, 231, 805, 245–247, 362/249.02; 47/58.1 LS
See application file for complete search history.

(56) References Cited

U.S. PATENT DOCUMENTS

| 5,012,609 A | 5/1991 | Ignatius et al. |
| 5,165,778 A | 11/1992 | Matthias et al. |
| 5,687,062 A * | 11/1997 | Larson .......................... 361/706 |
| 6,504,301 B1 * | 1/2003 | Lowery .......................... 313/512 |
| 6,554,450 B2 * | 4/2003 | Fang et al. ..................... 362/231 |
| 6,659,622 B2 * | 12/2003 | Katogi et al. ................. 362/219 |
| 6,809,347 B2 | 10/2004 | Tasch et al. |
| 6,860,619 B2 | 3/2005 | Swanson |
| 6,921,182 B2 * | 7/2005 | Anderson et al. ............. 362/231 |
| 7,140,751 B2 * | 11/2006 | Lin .......................... 362/249.02 |
| 7,173,383 B2 * | 2/2007 | Vornsand et al. ............. 315/291 |

(Continued)

OTHER PUBLICATIONS

Koninklijke Philips Electronics N.V., "Intellectual Property & Standards, Licensing Programs, LED-based Luminairies and Retrofit Bulbs", Nov. 11, 2010; www.ip.philips.com/services, 2 pages.

(Continued)

*Primary Examiner* — Alan Cariaso
(74) *Attorney, Agent, or Firm* — Davis Wright Tremaine LLP

(57) ABSTRACT

The LED grow light fixture uses a densely-packed array of high-brightness LEDs that are not individually packaged where the array behaves similarly to a point source of light. The extended point source LED array, with its lens and associated reflector, result in a concentrated, partially-collimated light source, such that the intensity of the light does not diminish rapidly as distance from the light source increases. The LED array contains a plurality of LED strings that may be separately controlled, thereby allowing the spectral content of the LED grow light to be varied, to facilitate desired plant growth at various stages of plant life. The light emitted at each of the multiple different wavelengths from the array is evenly distributed, when the objects being illuminated by the array are at a distance of less than about 6 feet or even less than 1 foot from the array.

27 Claims, 24 Drawing Sheets

(56) References Cited

U.S. PATENT DOCUMENTS

| | | | |
|---|---|---|---|
| 7,220,018 B2 * | 5/2007 | Crabb et al. | 362/234 |
| 7,543,952 B1 | 6/2009 | Chang | |
| 7,549,772 B2 * | 6/2009 | Wang | 362/294 |
| 7,676,915 B2 * | 3/2010 | Ter-Hovhannissian | 29/840 |
| 7,722,211 B2 * | 5/2010 | Marra et al. | 362/227 |
| 7,771,088 B2 * | 8/2010 | Chen | 362/294 |
| 7,893,445 B2 * | 2/2011 | van de Ven et al. | 257/89 |
| 8,038,319 B2 * | 10/2011 | Bailey | 362/245 |
| 8,057,060 B2 | 11/2011 | Fredricks | |
| 2007/0058368 A1 | 3/2007 | Partee et al. | |
| 2007/0253196 A1 | 11/2007 | Ormiston | |
| 2008/0218995 A1 | 9/2008 | Gilkey et al. | |
| 2009/0190363 A1 | 7/2009 | McDonnell et al. | |
| 2009/0288340 A1 | 11/2009 | Hess | |
| 2009/0315062 A1 | 12/2009 | Su et al. | |
| 2012/0044713 A1 * | 2/2012 | Chiang et al. | 362/554 |

OTHER PUBLICATIONS

Koninklijke Philips Electronics N.V., "Philips Color Kinetics Core LED Lighting Technologies", Nov. 11, 2010; www.colorkineties.com/technologies/core, 2 pages.

U.S. Office Action for U.S. Appl. No. 13/023,445 mailed Mar. 15, 2013, 29 pages.

\* cited by examiner

5C05

5C04

5C03

5C02

5C01

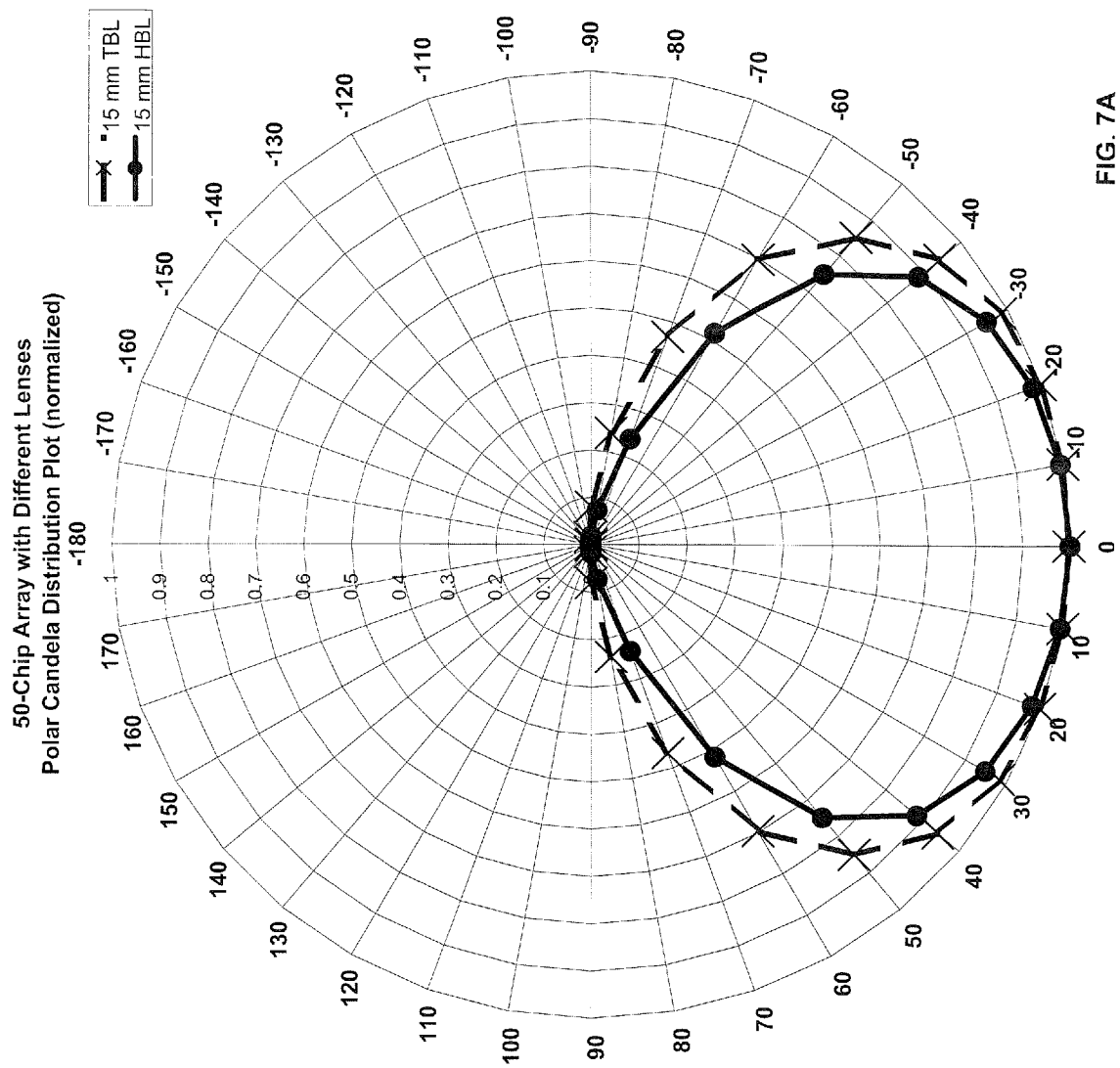

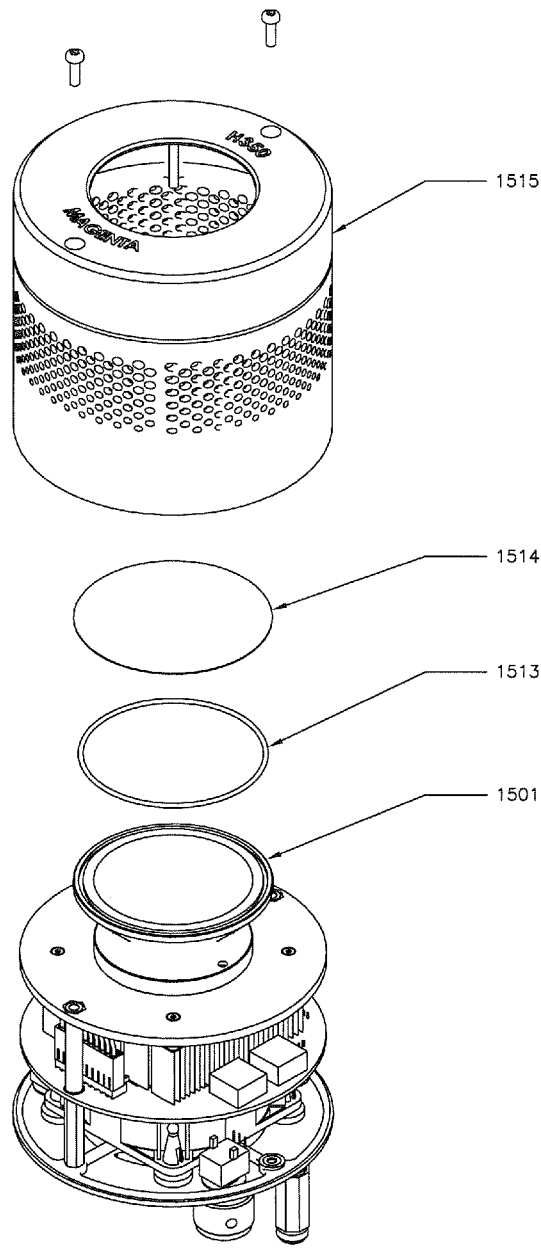
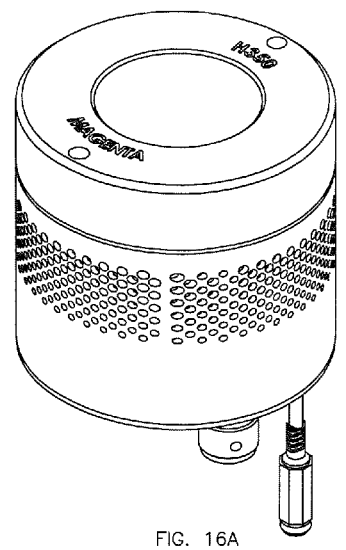
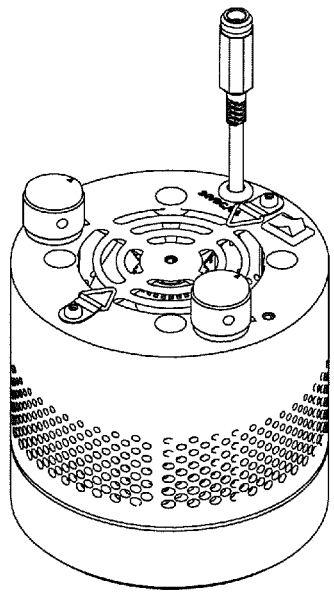
FIG. 15
FIG. 16A
FIG. 16B

US 8,523,385 B2

COMPACT HIGH BRIGHTNESS LED GROW LIGHT APPARATUS, USING AN EXTENDED POINT SOURCE LED ARRAY WITH LIGHT EMITTING DIODES

BACKGROUND

The present invention relates generally to electrical lamp fixtures used for growing plants, and specifically to an improved light emitting diode (LED) grow light apparatus, incorporating an extended point source LED array, preferably composed of LEDs of multiple wavelengths.

Typical grow lights make use of either metal halide (MH) incandescent bulbs, high pressure sodium (HPS) incandescent bulbs, or in some cases fluorescent bulbs. These broad-spectrum light sources are inefficient in producing light energy for the purpose of plant growth. In the case of fluorescent grow lights, the conversion of electrical energy into light energy is reasonably efficient, but the spectral content of the light energy is such that much of it is effectively wasted, and does not contribute to plant growth.

Metal halide and high pressure sodium bulbs can provide a very bright, intense light, but are also inefficient, both in terms of their conversion of electrical energy to light energy, and also in terms of spectral content. Furthermore, MH and HPS lights may generate wavelengths that are potentially harmful to plants. In particular, they product large amounts of radiated infrared (IR) energy, which can result in heat damage to plants. For this reason, MH and HPS lights may need to be mounted at some minimum distance above the plants, to avoid heat damage, thereby limiting their usefulness and mounting flexibility.

LED grow lights in general offer several advantages when used to grow plants. The conversion of electrical energy to light energy by LEDs is generally efficient, especially when compared to incandescent bulbs such as MH and HPS bulbs.

Another general advantage of LED grow lights is that the light from LEDs is partially directional, in contrast to the light that is emitted from broadband incandescent (MH and HPS) and fluorescent light sources. In particular, the light from LEDs is primarily emitted from the "top" surface of an LED chip. This lends itself to simpler reflector designs.

The primary historical disadvantage of existing and prior art LED grow lights has been their relative lack of total light output, especially when compared to MH and HPS grow lights, which are available as 400-1,000 Watt fixtures. Research in LEDs and solid-state lighting has resulted in the development of high brightness LEDs that efficiently produce relatively larger levels of light output, at higher electrical current levels. This has largely been achieved via advances in drawing heat away from the active junction of the LED, thereby allowing the LED to safely operate at these higher current levels. The electrical-to-optical conversion efficiency of LEDs is also being improved over time. However, in order to provide a sufficient total light output, most prior art LED grow lights require large numbers of LEDs, which are typically spaced widely apart in order to deal with the resultant heat dissipation issues. The spacing between adjacent LED chips in prior art LED grow lights is therefore several inches, or more. This negates much of the potential size and cost advantages of an LED grow light. In order to achieve the light output of 20 or more LED chips, the surface area of the prior-art LED grow light must be large. Also, each of the widely-spaced LED chips requires individual separate packaging, separate heat-sinking, and separate optics, thereby adding significantly to the size and cost of the grow light.

SUMMARY

A compact LED grow light apparatus comprises an array of multiple LED chips without individual packaging, wherein the LED chips are distributed laterally over an area. The LED chips have light emitting surfaces for emitting light in directions transverse to said area, wherein the dimensions of the area do not exceed 25 mm. The apparatus further includes an optical lens adjacent to the light emitting surfaces of the LED chips in said array that collects and directs light emitted by the LED chips of the array towards plants to enhance their growth; and a reflector surrounding said array reflecting light emitted by the LED chips of the array towards plants to enhance their growth.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

BRIEF DESCRIPTION OF THE DRAWINGS

FIGS. 7A and 7B show the spatial light distribution profiles of two embodiments of the 50-chip LED array used in the present invention, one using a half-ball lens (HBL), and the other using a truncated-ball lens (TBL), as a primary optic.

FIG. 15 shows the outer housing and other elements of one embodiment of the present invention.

FIGS. 16A and 16B show one embodiment of the present invention, in fully-assembled form.

DETAILED DESCRIPTION OF THE PREFERRED EMBODIMENTS

Figure 1:
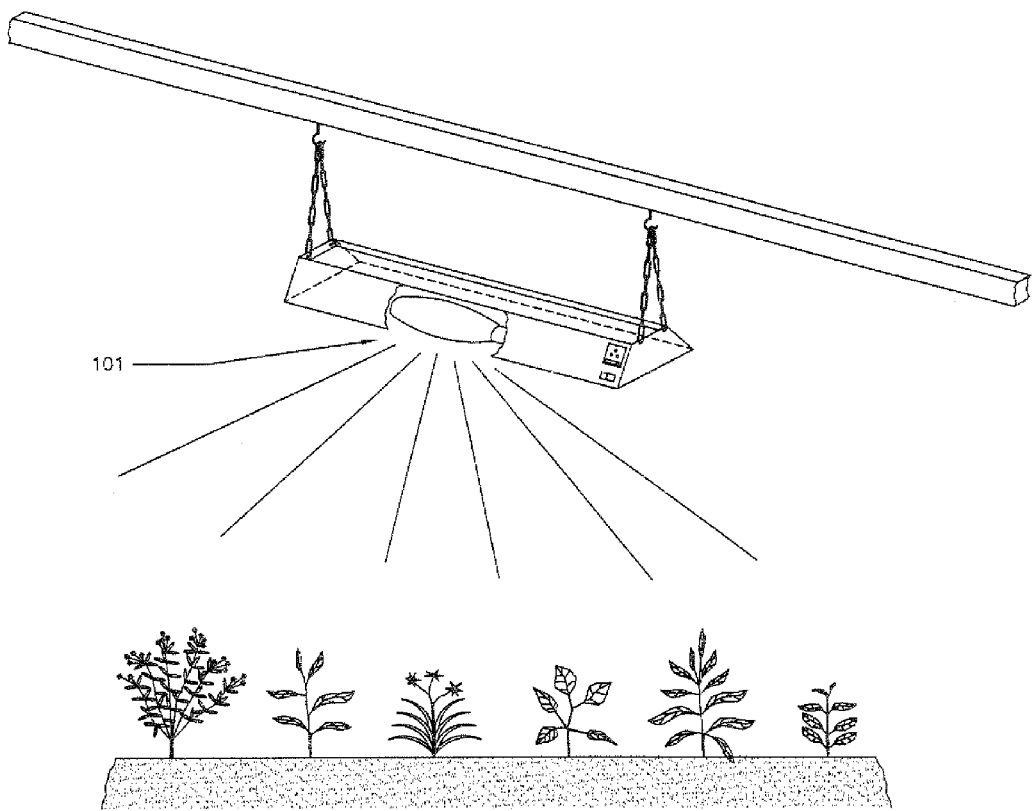
FIG. 1 is a representation of the prior art of a typical grow light using a High Pressure Sodium incandescent bulb.

The present invention of a compact, high brightness LED grow light, using an extended point source LED array made up of light emitting diodes of multiple wavelengths, addresses the disadvantages of prior art LED grow lights, while at the same time providing the advantages that are generally applicable to LED grow lights. The ideal LED grow light would be compact, and yet it would provide a very intense light. It would be very efficient at converting electrical energy into light energy that was maximally useful for plant growth, while providing minimal levels of light and heat energy that is not useful for plant growth. It would allow flexible customization of specific wavelengths for promoting specific plant growth patterns and behaviors, with dynamic control capabilities to vary its light output over time (both in terms of spectral content, as well as intensity). It would also offer flexible mounting options, to support a variety of plant growing applications and environments. It could be used as the sole source of light for the plants, or as a supplement for natural sunlight. When used as a supplement for natural sunlight, the ideal LED grow light would not block or shade the plants from natural sunlight. Other highly desirable attributes include low cost, compact size, low power consumption, and high reliability.

The prior art in LED grow lights typically possess one or more significant shortcomings, in most cases based on their use of large numbers of widely-spaced, separately packaged LEDs, as well as the use of simple control systems with little flexibility. Prior art LED grow lights are typically implemented as large light bars, typically two to four feet in length, or as large rectangular panels, again with length and width dimensions of two or more feet. The light bar form implements a single row of widely-spaced, separately-packaged LEDs, and it is difficult to obtain sufficient light output, as well as an even, well-mixed, spatial distribution of light intensity. The light panel form, by providing space for multiple rows of widely-spaced, separately-packaged LEDs, can provide more total light output, with a somewhat more even or uniform spatial distribution. However, the large panel form incurs additional cost, and also effectively shades the plants from natural sunlight that may also be present in the growing environment, making this form of LED grow light less effective as a supplement for natural sunlight. Both the light bar and light panel forms typically suffer from the general disadvantages of high cost and relatively large size. Much of the cost and size disadvantage is directly due to the need to space the individual LED chips relatively far apart, with separate chip packaging, heat-sinking, and optics.

The present invention makes use of a dense array of multiple closely-spaced LED chips without individual packaging, which array acts as an extended point source of light. Instead of packaging each individual LED chip, a housing encloses the array of multiple LED chips as described below. The LED chips are distributed laterally over an area. The LED chips have light emitting surfaces for emitting light in directions transverse to said area, wherein the dimensions of the area do not exceed 25 mm. For example, the total diameter of the cluster of LED chips may be on the order of 8-25 mm, depending on the number of LED chips in the array, and the size of the LED chips. The spacing between individual adjacent LED chips is less than about 0.2 mm, such as on the order of a tenth of a millimeter, and not multiple inches, as is the case with prior-art LED grow lights.

The array is preferably configured as multiple strings of LEDs, with each string containing multiple LED chips. Each string can be controlled separately, allowing for dynamic control of the brightness of each string, over time. Because each string contains multiple LED chips, the spectral content of each string of LEDs can be customized in terms of its spectral content. Because each string is also separately controlled, it is possible to vary the overall spectral content of the light output, over time. For example, in one embodiment of the present invention, some LED strings could be made up of various wavelengths of red and deep red LEDs, whereas other LED strings of the same array could be made up of various wavelengths of blue light. By controlling the brightness of the LED strings, the relative mix of red and blue light can be varied. In other words, instead of using a single type or wavelength of red LED, it is possible to use several wavelength bands within the red portion of the spectrum, thereby providing a broader range of red light than could be provided by single LEDs. The same principle applies to the use of multiple wavelengths within the blue portion of the spectrum.

The small form factor of the LED array, and the close spacing of its LED strings and chips, results in a high intensity light from a small area. As such, the LED array behaves as an extended point source of light. In prior art LED grow lights, in which widely-spaced LEDs are each emitting a single, narrow-spaced range of wavelengths, the light from these multiple sources must be mixed via multiple sets of lenses and other optical elements, in order to achieve an even distribution of the light from the multiple sources (which might also be of multiple wavelengths). Even when such elaborate arrangement is used, light from these multiple sources cannot be satisfactorily mixed until the plants are at long distances from the sources.

In contrast, the present invention's LED array emits all of the wavelengths embodied in its multiple LED strings and multiple LED chips, from a single small-area array (with an effective diameter of only 8-25 mm, for example). The light as emitted from the LED array is therefore already well-mixed in terms of spectral content, even at very short distances from the plants, such as less than about 6 feet, or less than about 3 feet, or even less than about 1 foot, if this is desired. Since all of the LED chips in the LED array are covered by a single lens, with a diameter (e.g. about 30 mm for a 25 mm diameter LED array) that is only slightly larger than the diameter of the LED array, the cost and complexity of optics is greatly reduced. In other words, the optical lens has a principal plane, where dimensions of the optical lens along its principal plane are less than about 30 mm. Secondary optics, such as a reflector or secondary lens system, can be used to create a variety of light distribution patterns, dependent on both the intended area of illumination, as well as on the intended distance from the area to be illuminated. If the optics are designed to produce a fairly concentrated beam (e.g. a spot light), then the intensity of light will drop relatively slowly as a function of distance from the light source, resulting in more even distribution of light across the full height of a growing plant. In other words, the lower foliage of the plant will receive almost as much light energy as the upper foliage of the plant, in a manner that is more consistent with natural sunlight. In applications where even greater light intensity is required, it is possible to use larger LED arrays containing a large number of LED chips. Alternatively, it is also possible to package multiple LED arrays into a single, larger size LED grow light fixture. In such an embodiment of the present invention, a single, larger reflector may be used to direct the light output from all of the LED arrays mounted in the grow light.

Thermal management is a key element of the design of the present invention, in order to extract the heat that is generated by the large number of LED chips that are packaged closely together in the LED array(s). The LED array incorporates a metal circuit board (MCB) which provides for the routing of conductive traces to each of the LED strings, while at the same time providing electrical isolation between LED strings. The MCB also provides for high thermal conductivity, to extract heat from the densely-packed LED chips. The MCB LED array substrate, having the thermal conductivity of metal, conducts the heat from the LEDs to the base of the MCB substrate, which is mounted onto a heat sink. The MCB of the present invention is described in more detail in U.S. patent application Ser. No. 12/145,395, filed on Jun. 24, 2008, entitled "A LIGHT EMITTING DIODE SUBMOUNT WITH HIGH THERMAL CONDUCTIVITY FOR HIGH POWER OPERATION".

The present invention utilizes a heat sink containing preferably an internal "vapor chamber" in which phase change of a contained liquid (into vapor) is used to maximize heat transfer. The vapor chamber element transfers heat very efficiently to a more traditional finned heat sink.

In some embodiments of the present invention, the heat sink dissipates thermal energy via natural convection, aided by venting of the LED grow light's housing. In other embodiments of the present invention, the dissipation of thermal energy from the heat sink is aided by a small electric fan, mounted within the LED grow light's housing.

In order to allow for effective use in a variety of plant growing environments, the LED grow light provides multiple flexible mounting arrangements. In one embodiment of the present invention, the LED grow light, or multiple LED grow lights, can be hung by their DC power cords over the plant growing area. Alternatively, separate cables or light-weight chains may be used to support or hang the grow lights. In cases where very high levels of total light output are needed, it is possible to mount multiple LED arrays close together, in a common housing, either on a single heat sink that is common to the multiple arrays, or in a modular construction that uses multiple array and heat sink modules. In another embodiment, a telescoping mount with a flexible "elbow" joint can be used to mount LED grow lights so that they shine light from the side, or aimed up at the underside of the plant foliage, in addition to the more usual arrangement of shining light from above the plants. An additional spike mount option can be used to position LED grow lights just above the ground, to provided intense light from the base of the plants.

In many plant growing applications, it will be desirable to use multiple LED grow lights, possibly configured to provide different wavelengths of light. For such applications, the present invention includes the option of a LED grow light mounting rack, in order to support multiple LED grow lights at different positions above a larger plant growing area. In one embodiment of the present invention, the mounting rack may be motorized, and designed to rotate, in order to facilitate even mixing of light from multiple LED grow lights, which might consist of different wavelengths. In a slight variation, the mounting rack will move in a back-and-forth manner, rather than continuous rotation, which reduces the complexity of the electrical power connections to the LED grow lights. It is also possible to apply other forms of motion to individual LED grow lights or groups of LED grow lights, including linear or rectilinear motion.

Figure 2:
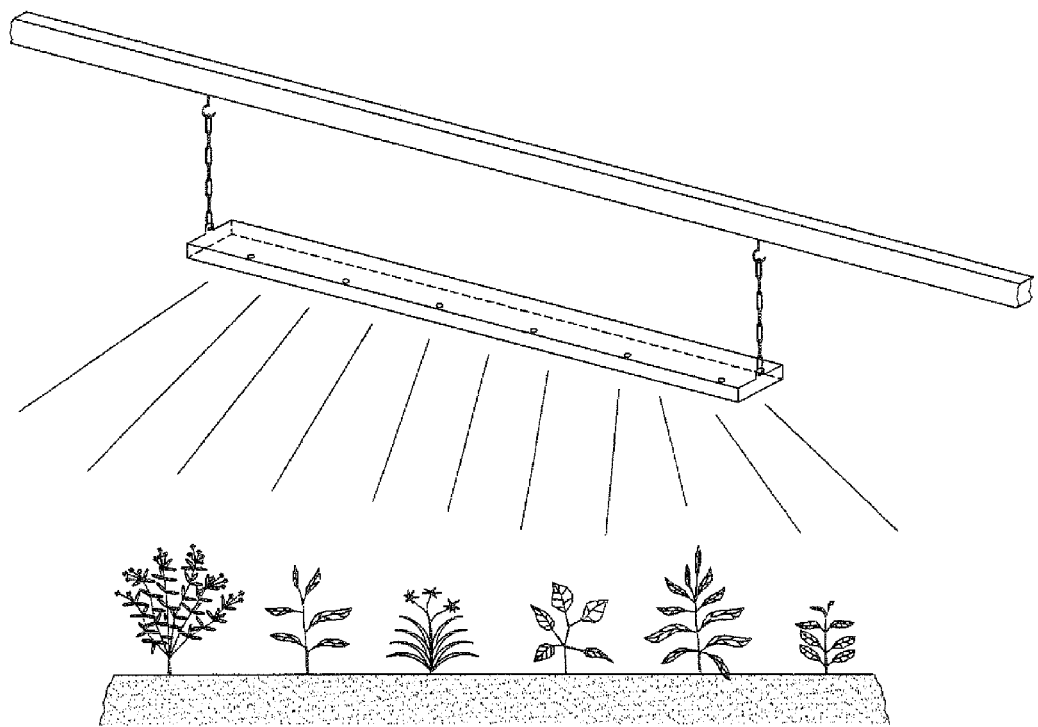
FIG. 2 is a representation of the prior art in LED grow lights, using a linear arrangement of widely spaced, separately packaged LEDs.
Figure 2:
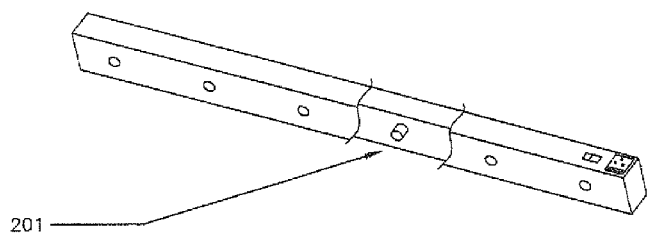
Figure 3:
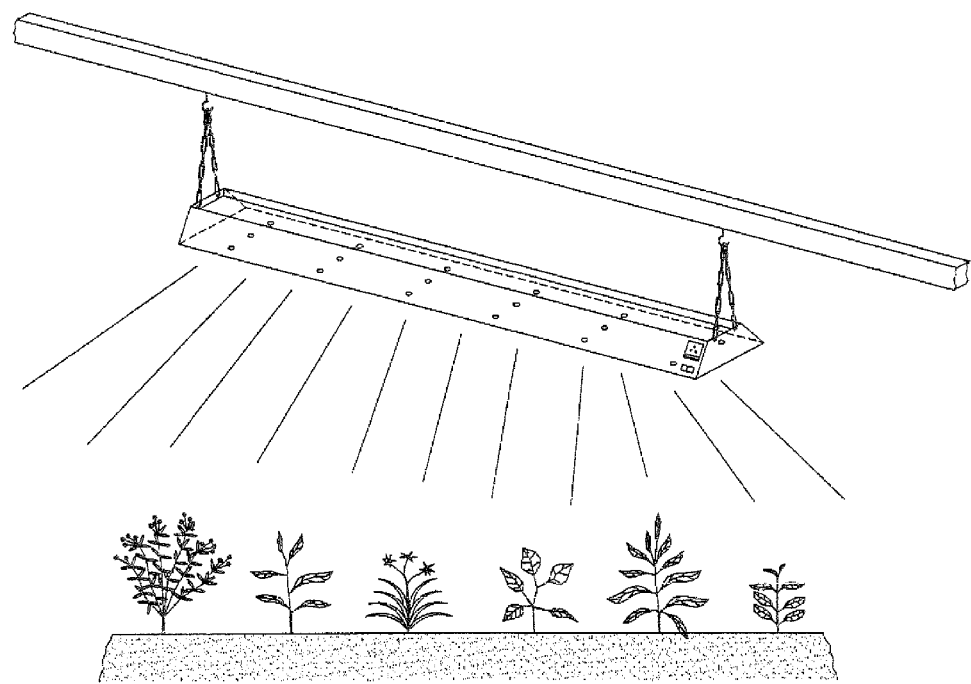
FIG. 3 is a representation of the prior art in LED grow lights, using a flat panel arrangement of widely spaced, separately packaged LEDs.
Figure 3:
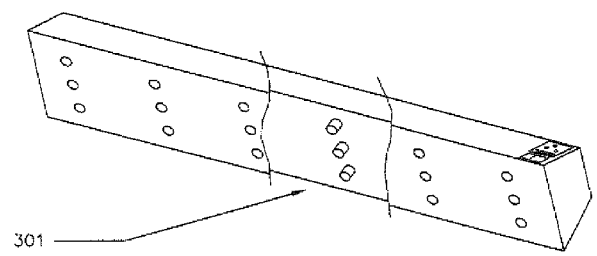

FIGS. 1, 2, 3 represent three embodiments of the prior art in grow lights. FIG. 1 shows a typical grow light that uses a High Pressure Sodium (HPS) incandescent bulb (101). The length and width dimensions of a typical HPS grow light are in the range of two to four feet. Similar arrangements could be used with either a Metal Halide (MH) incandescent bulb, or some form of fluorescent bulb. In all cases, the amount of light provided, as well as the spectral content of the light, is determined by the properties of the bulb that is used. In the case of an HPS grow light, as shown in FIG. 1, the total amount of light produced is quite large, and is therefore sufficient to illuminate a fairly large area, such as a 4'×4' plant table or tray. However, a substantial amount of electrical power is required. Typical HPS grow lights use 400-1000 Watts of electrical power. It is also the case that much of the spectral content of an HPS bulb is not efficiently used by photosynthesis processes. In particular, HPS bulbs produce large amounts of visible light in the yellow and green portions of the spectrum that are not efficiently used in photosynthesis. They also produce large amounts of infrared energy that may in fact be harmful to the plants that are illuminated. In comparison to an HPS grow light, Metal Halide and fluorescent grow lights tend to produce less total light output, and consume less electrical power, and are therefore typically used for lighting smaller plant growing areas. In general, however, the same disadvantages of HPS grow lights also apply to MH and fluorescent grow lights, although fluorescent grow lights are more efficient at converting electrical energy to light energy.

LEDs emit light over a fairly narrow range of wavelengths, and so it is possible to tailor the wavelengths of LED grow lights to more efficiently promote plant growth, and even to promote specific aspects of plant growth, whether it is growth of foliage, flowering, production of vegetables or fruit, reproduction, etc.

Generally speaking, plants efficiently absorb, via photosynthesis processes, light energy in the wavelengths of 610-700 nm, approximately (red and near-infrared wavelengths), and also in the wavelengths of 400-500 nm, approximately (primarily blue wavelengths). Plants exposed to intense light in these regions show increased production of Chlorophyll A and B. Blue light triggers morphogenesis processes which cause the plant to morph or change form during some growth phases. Some wavelengths of blue light promote leaf production and vegetative growth and density. Red light provides energy for plant growth, including stem growth and elongation. Red light also encourages some plant reproductive processes, including flowering. Within a wavelength region, different specific wavelengths may be related to the encouragement of specific plant growth patterns and other plant characteristics, in ways that are only beginning to be understood. The ability of LED grow lights to provide specific wavelengths of light leads to increased efficiency of plant growth, and also potentially enables the tailoring of specific plant characteristics. Further, the absence of radiated IR and unintended ultraviolet (UV) wavelengths helps avoid damage to plants, especially when grow lights are positioned close to the plants.

FIG. 2 shows an embodiment of the prior art in LED grow lights. In this embodiment, described in US Patent 2007/0058368 A1 (Partee et al.), multiple individually-packaged, and widely-spaced (multiple inches apart) LEDs (201) are mounted on a long bar, with typical length of two to four feet. The resulting linear arrangement of LEDs results in a fairly narrow, rectangular light pattern, although the evenness of light distribution is dependent on the reflector design for each LED. FIG. 3 shows another embodiment of the prior art in LED grow lights, as described in US Patent 2009/0288340 A1 (Hess). In this embodiment, multiple individually-packaged, and widely-spaced LEDs (301) are arranged in a rectangular pattern, which lends itself to more even distribution of light over a wider rectangular area, such that the properties of the reflectors used at each LED position are less critical. Both of these embodiments of the prior art in LED grow lights provide for improvements in efficiency over traditional, non-LED grow lights. These efficiency improvements are the result of the efficiency of LEDs in converting electrical energy to optical energy, as well as the ability to tailor the spectral content of LED grow lights to the wavelength ranges that most efficiently contribute to photosynthesis processes (primarily red and blue wavelengths).

The embodiments of the prior art in LED grow lights, as shown in FIGS. 2 and 3, also have significant disadvantages. Due to the use of multiple separately-packaged and widely-spaced LEDs, typically spaced multiple inches apart, the cost of the packaging of the LEDs, and the cost of the heat-sinking and optics/reflectors needed at each LED location, is relatively high. In order to get sufficient light output, and a relatively even distribution of light, a large fixture is needed, with length and/or width dimensions of two to four feet. In the case of the embodiment shown in FIG. 3, the large rectangular fixture will tend to block natural sunlight from reaching the plant growing area, which makes this embodiment unsuitable as a supplemental light source. If LEDs of multiple wavelengths are used, it will also be difficult to have an even distribution or mixing of the multiple wavelengths when the LED grow light is placed at the typical distance of about 2-4 feet from the plants, as different wavelengths will be emitting from different, widely-spaced LED locations within the fixture. It is, of course, possible to place the LED grow light is placed at distances greater than 4 feet from the plants to allow the multiple wavelengths emitted from different, widely-spaced LED locations to mix. However, this means that a reduced total amount of light will reach the plants. This reduces the effectiveness of the grow light, which is undesirable. In other words, the grower will have to seek a compromise between two incompatible goals: even mixing of the multiple wavelengths and an adequate level of illumination to enhance growth.

Figure 4A:
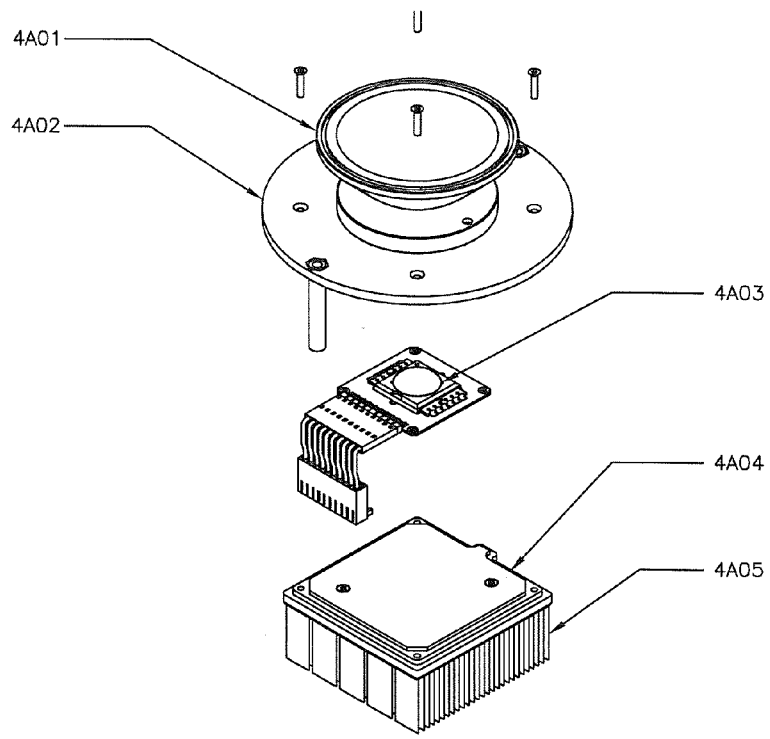
FIG. 4A is a representation of a portion of the present invention, not including the LED grow light's mechanical housing and control electronics.

FIG. 4A shows one embodiment of a portion of the present invention. In this embodiment, multiple LED chips without separate individual packaging, either of a single wavelength, or of multiple wavelengths, are mounted into a single, densely-packed LED array (4A03). Adjacent chips of the array are preferably separated by less than about 0.2 mm, such as 0.1 mm. The LED array is mounted onto a two-stage heat sink (4A04 and 4A05), and are distributed over an area of a substrate not more than 25 mm in dimensions in any direction, where the dimensions of the area depend on the number of LED chips in the array. Since the surface area of the LED array is relatively small, a single reflector (4A01) is used for the entire array, mounted on a front plate (4A02). The front face of the reflector (4A01), shown facing up in FIG. 4A, will typically be covered with a transparent piece of glass, or alternatively, plastic. This transparent cover serves to protect the reflector and LED array, and also to prevent contact with the reflector surface and the LED array's lens. In cases where very good light mixing is required, for improved uniformity of the light output and spectral content, an optical diffuser element may optionally be incorporated, either as a separate element just under the transparent cover, or in place of the transparent cover. The diffuser element may be made of glass or plastic.

Figure 4B:
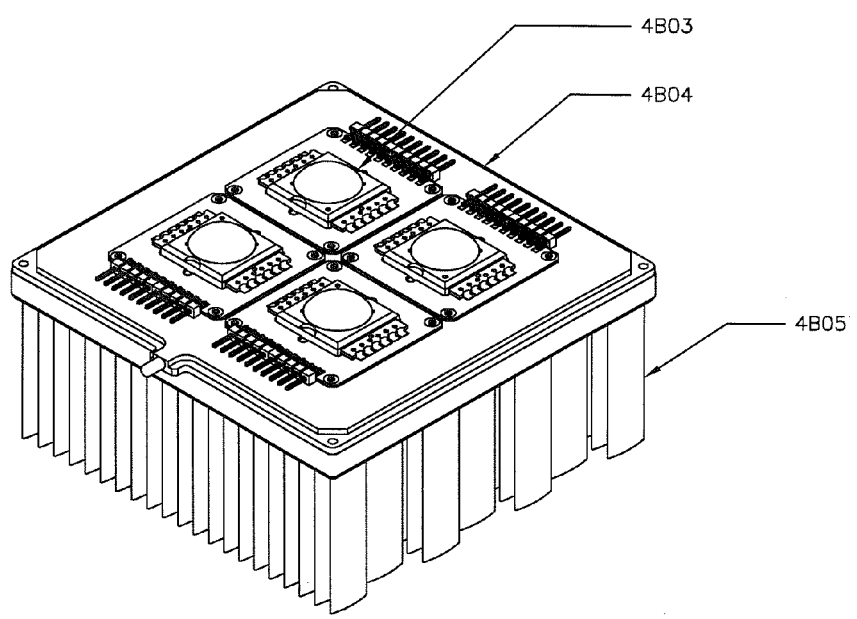
FIG. 4B is a representation of a portion of another embodiment of the present invention, in which multiple LED arrays are mounted onto a single heat sink.

FIG. 4B shows a portion of another embodiment of the present invention, in which multiple LED arrays (4B03) are mounted onto a larger two-stage heat sink (4B04 and 4B05). The intent of this embodiment is to produce larger amounts of total light output than could be provided from a single LED array.

Figure 4C:
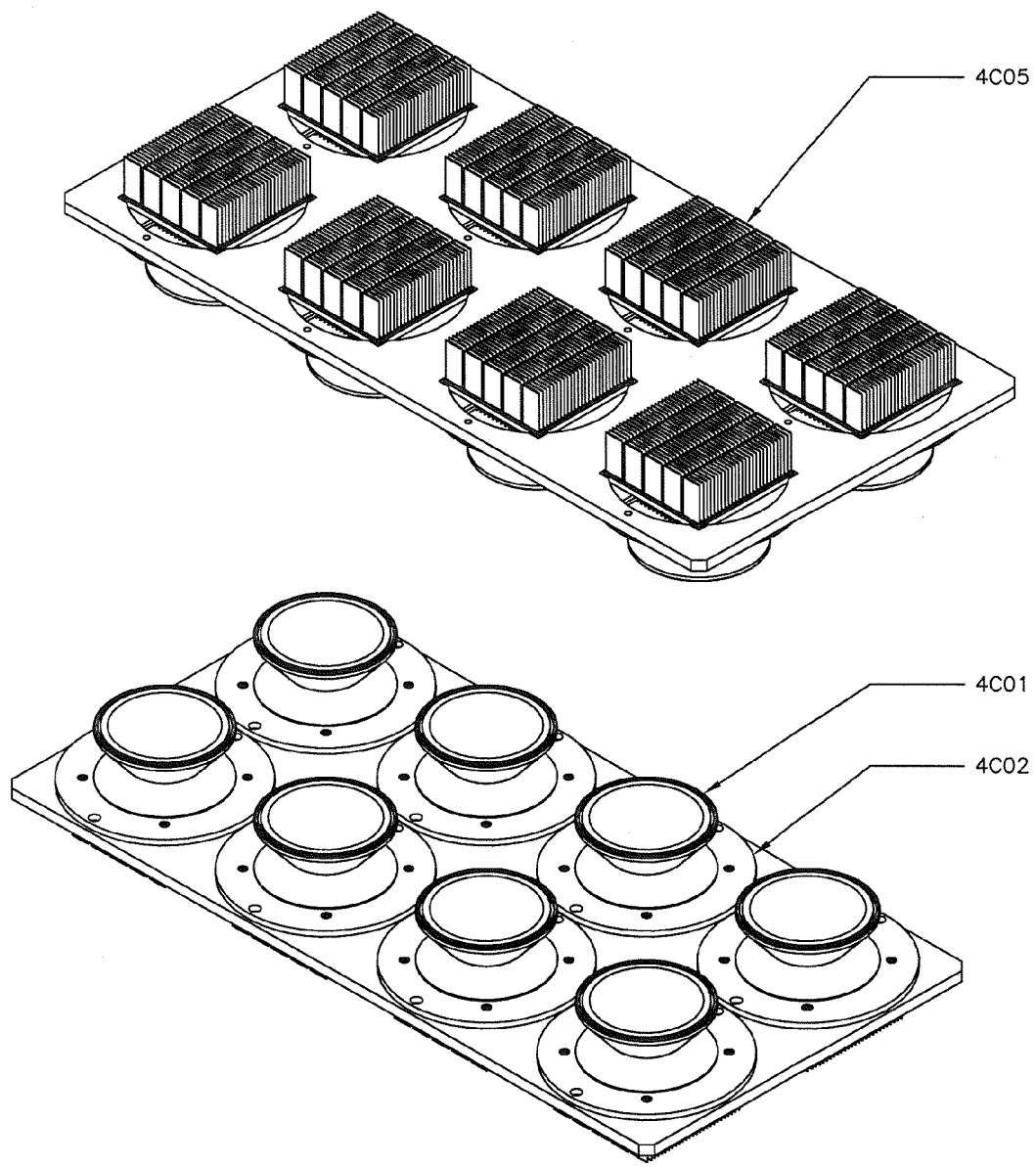
FIG. 4C is a representation of a portion of another embodiment of the present invention, in which multiple LED array modules, each with its own heat sink and reflector, are mounted onto a single panel, as part of a single housing.

FIG. 4C shows a portion of another embodiment of the present invention, in which multiple LED array modules, each with its own heat sink (4C05) and reflector (4C01 and 4C02), are mounted onto a single panel, as part of a single housing. As with the embodiment shown in FIG. 4B, the intent of this embodiment is to produce larger amounts of total light output than could be provided from a single LED array. The modular approach shown in FIG. 4C can be used to make light panels of varied dimensions, with extremely high light output. Although the dimensions and form factor of such a light panel will be larger than the compact single-array LED grow lights based on the embodiment shown in FIG. 4A, said dimensions will still be smaller than panel-based LED grow lights of the prior art, of similar light output, due to the dense packing of many LED chips without separate individual packaging into each LED array module.

The remainder of the description of the preferred embodiments, below, will refer to embodiments that use a single LED array.

Figure 5A:
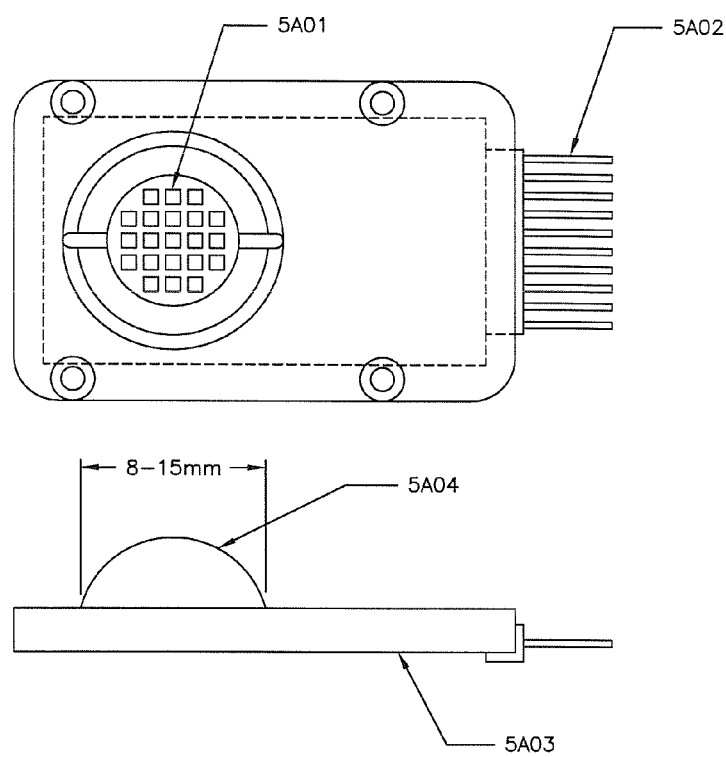
FIG. 5A is a representation of one embodiment of the densely-packed LED array used in the present invention, with 21 LED chips.
Figure 5B:
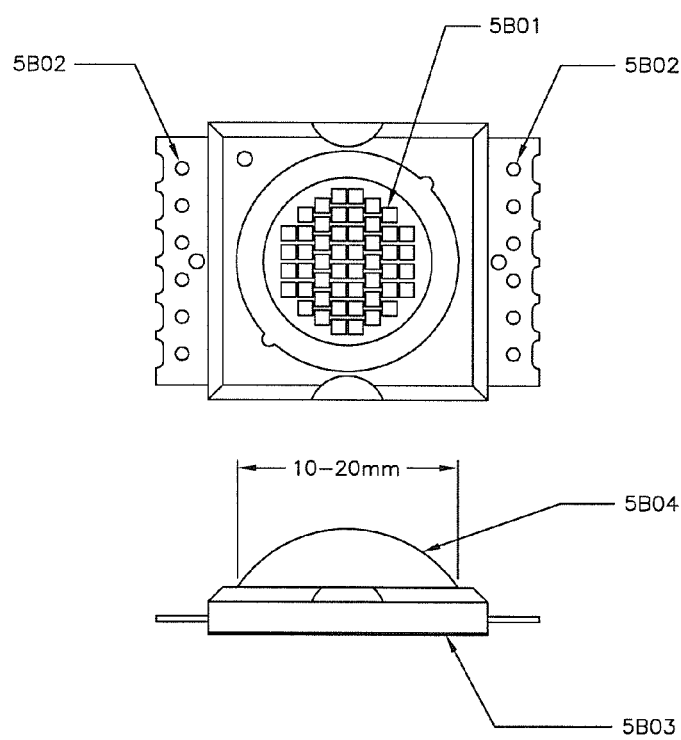
FIG. 5B is a representation of another embodiment of the densely-packed LED array used in the present invention, with 50 LED chips.

FIGS. 5A and 5B show two embodiments of the LED array used in the present invention. FIG. 5A shows a 21-chip LED array, and FIG. 5B shows a 50-chip LED array. Other embodiments of the LED array may contain fewer than 21 chips, or as many as 100 LED chips. The individual LED chips of the embodiments shown in FIGS. 5A and 5B are approximately 1 mm×1 mm in size. However, LED chips of other dimensions may also be used, and the diameter of the light-emitting area is therefore a function both of the number of LED chips, as well as the individual chip dimensions. In FIGS. 5A and 5B, the LED chips are shown as element (5A01 and 5B01, respectively), with each small square representing an individual LED chip. The diameter of the light-emitting area of the array is approximately 8-12 mm for the 21-chip LED array, and 10-15 mm for the 50-chip LED array, thereby allowing the LED array to function as an "extended point source". LED arrays with a larger number of chips (up to 100 chips, or even more), or LED arrays that use larger LED chips, may have a somewhat larger light-emitting area, with diameters up to approximately 25 mm. Note that the single lens that is placed over the light-emitting area of the LED array may have a diameter that is slightly larger than the actual light-emitting area, such as a diameter of about 30 mm.

The LED chips within each array are connected electrically into four channels, or potentially more than four channels, each channel consisting of a series string of multiple LED chips. An LED string or channel is controlled as a single entity, with all LED chips within the series string having an identical electrical current passing through them, and therefore each chip within a string will produce light of similar brightness. Separate electrical connections (5A02 and 5B02) are provided for each LED string within the array, either in the form of electrical pins (5A02), or as electrical pads (5B02), so that the relative brightness of the different strings can be controlled and varied independently. The LED arrays shown in FIGS. 5A and 5B also incorporate an internally-mounted thermistor chip, which is brought out to two of the electrical connections, for the purposes of monitoring array temperature.

In most embodiments of the present invention, the LEDs within a string would be of similar wavelengths. However, different strings might contain LEDs of widely-varying wavelengths. In one embodiment of the LED array, some strings would consist of different wavelengths of blue light, and other strings would consist of different wavelengths of red light. By separately controlling the electrical current flowing through different LED strings, the relative proportions of red and blue light can be varied. Within a particular string, it is still possible to use individual LED chips of multiple wavelengths, although the brightness of the LED chips within a string will be essentially the same. In one embodiment of the present invention, multiple wavelength ranges of blue light (e.g. ~425 nm, ~450 nm, and ~470 nm) could be used in a string, in order to achieve broader coverage of the blue portion of the spectrum. Similarly, multiple wavelength ranges of red light (e.g. ~625 nm and ~660 nm) could be used within a string, in order to achieve broader coverage of the red portion of the spectrum.

Figure 6A:
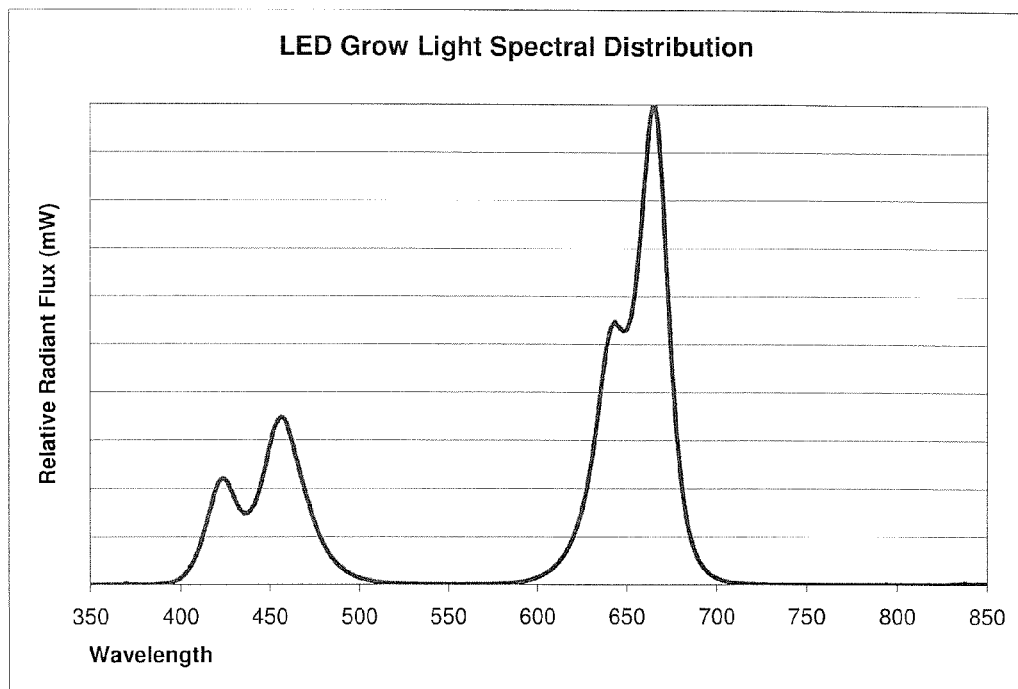
FIG. 6A shows the spectral output of one embodiment of the densely-packed LED array used in the present invention, using LEDs of four wavelengths.

FIG. 6A shows the spectral distribution of light for one such embodiment of the LED array of the present invention, in which two wavelength ranges of blue light are provided, as well as two wavelengths of red light. The peaks of these four wavelength ranges can be seen in the figure. If ongoing research indicates the value of other specific wavelengths, such as amber, yellow, or green visible light, or even the intentional inclusion of IR or UV wavelengths, for encouraging specific plant attributes, it is possible to incorporate one or more LED chips of those additional wavelengths into the array.

Since all of the LEDs of the array are contained within a small area (with a diameter of approximately 12 mm in FIG. 5A, and 15 mm in FIG. 5B), with a single reflector, the mixed red and blue (or other) light will be directed uniformly over the plant growing area that is being illuminated at a typical distance from the plants of less than 4 feet. As such, the mixed light output of the entire array can be viewed as coming from an "extended point source", of a small area. Note that the dimensions shown in FIGS. 5A and 5B are approximate, and may vary with the number of LED chips in the array, the size of the individual LED chips, the specific configuration of LED channels within the array, and also the type of lens used.

Figure 6B:
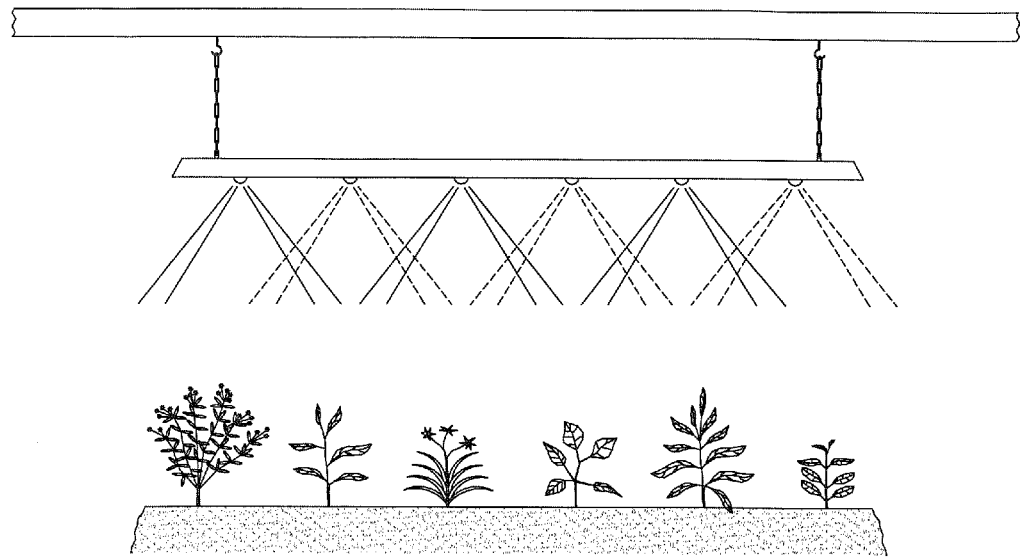
FIG. 6B illustrates the lack of spectral uniformity of one embodiment of the prior art in LED grow lights, using separately-packaged, individual LEDs of two wavelengths.

FIG. 6B shows an embodiment of the prior art in LED grow lights, in which individually-packaged LEDs of two different wavelengths are mounted in separate locations on a light bar or light panel. In this embodiment, the light of the two wavelengths (depicted using solid and dashed lines or rays) will be unevenly distributed over the plant growing area, such that individual plants will see different blends of the two wavelengths.

Figure 6C:
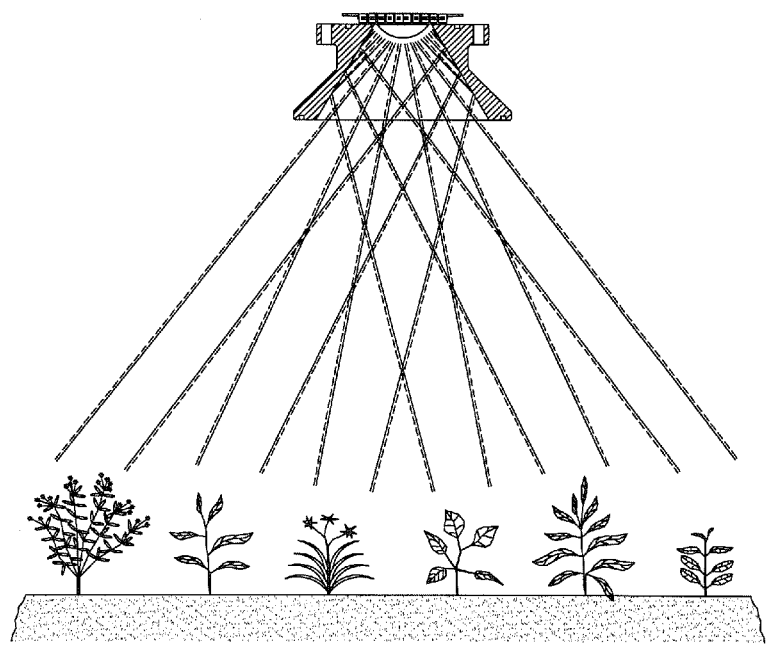
FIG. 6C shows the uniform spectral distribution of one embodiment of the present invention, using a densely-packed LED array containing LED chips of two wavelengths.

FIG. 6C shows an embodiment of the present invention, in which LED chips without individual packaging emitting at least two different wavelengths are packaged at different locations in a densely-packed LED array, of the form shown in either FIG. 5A or FIG. 5B, with a single lens and a single reflector, as discussed below. In this embodiment, the spatial distribution of the at least two wavelengths is substantially identical at a typical distance from the plants of less than 4 feet, so that all of the individual plants in the plant growing area receive light with the same spectral content.

Figure 7B:
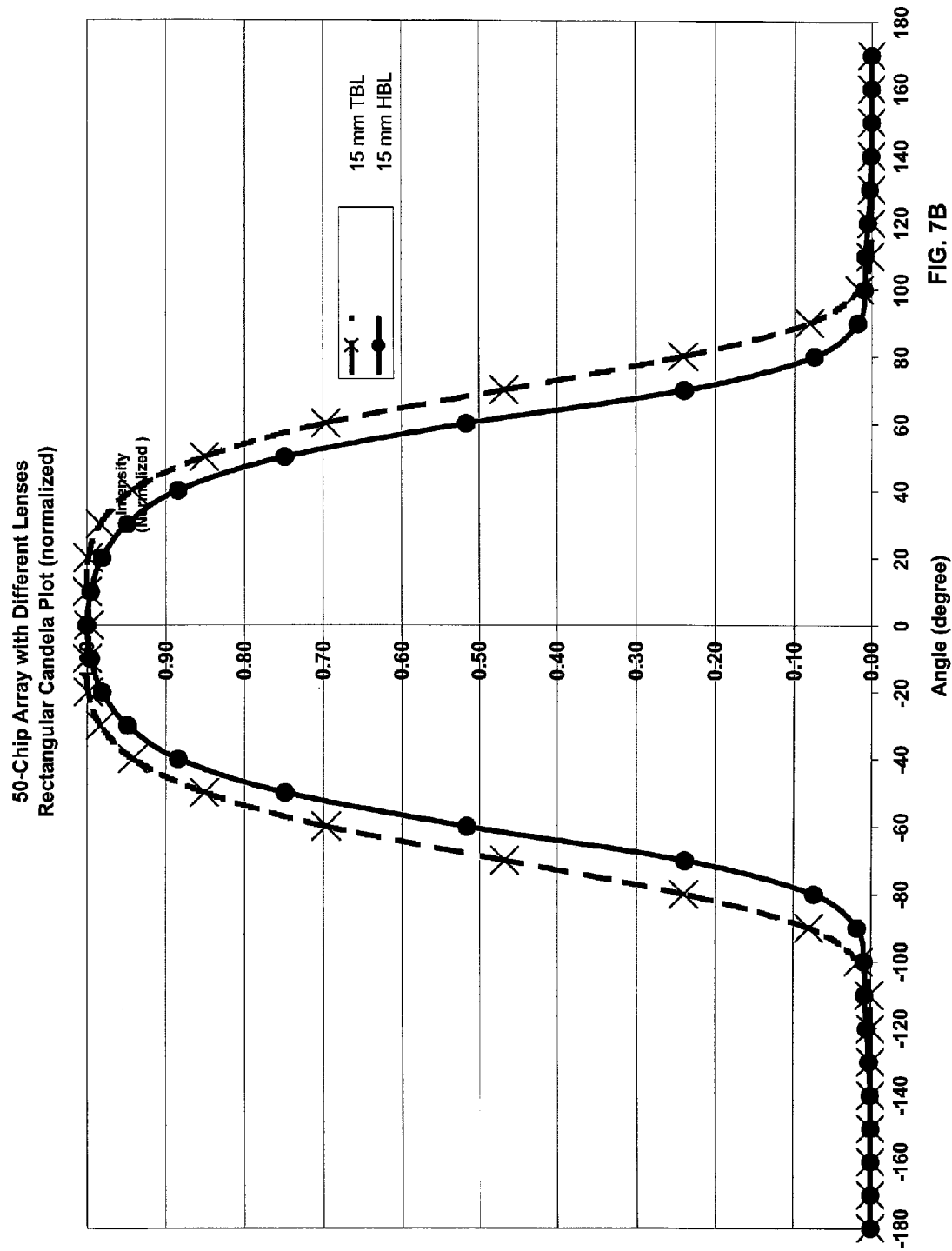

Due to the relatively small light-emitting surface area of the LED array, a single lens can be used as the primary optic. Since LED chips emit light in an upwards direction (with the LED array oriented as in FIGS. 4A, 4B), a simple lens element can be mounted on the surface of the LED array. In the embodiment of the LED array shown in FIG. 5A, a commercially-available half-ball lens (HBL) is used (5A04). In another embodiment of the LED array, as shown in FIG. 5B, a Truncated Ball Lens (TBL) is used (5B04), which can be visualized as a half-ball lens in which the base has been ground down to make a "flatter" lens of similar diameter. Either type of lens may be used with LED arrays of different LED chip count, although the diameter of the lens depends on the number of LED chips in the array. FIGS. 7A and 7B show the spatial distribution of light output from a 50-chip LED array, using either a 15 mm diameter half-ball lens (HBL), or a 15 mm diameter truncated ball lens (TBL), shown using polar coordinates and rectangular coordinates, respectively. As can be seen in the plots, the truncated ball lens (TBL) produces a somewhat broader, flatter light distribution pattern.

Figure 8:
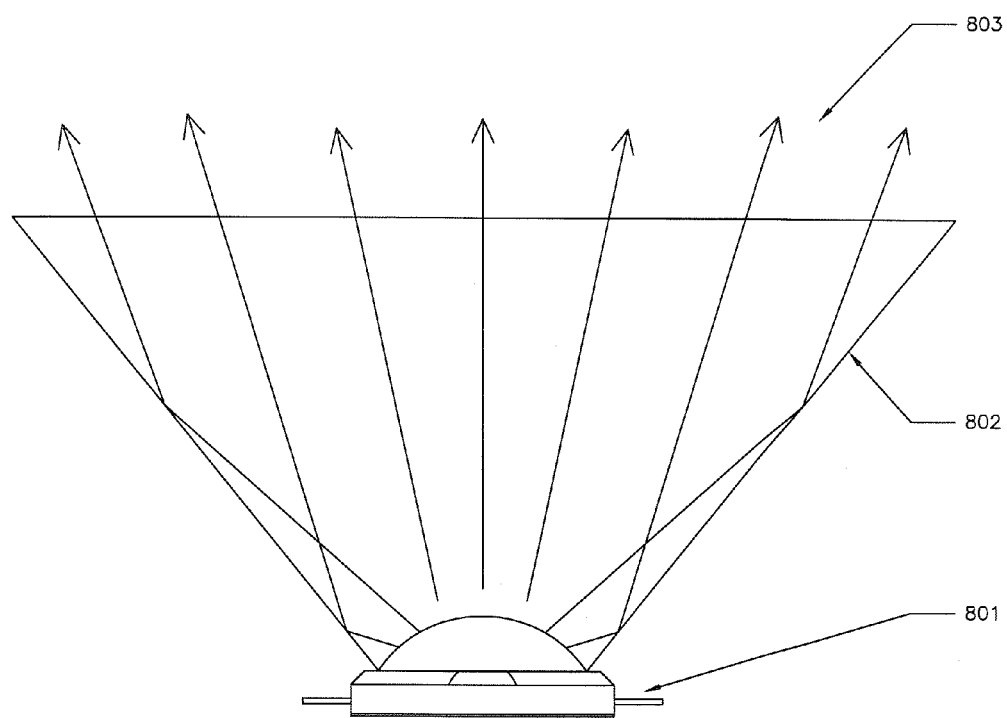
FIG. 8 shows a side view of the 50-chip LED array of the present invention, using one embodiment of a reflector, providing a wide beam pattern.
Figure 9:
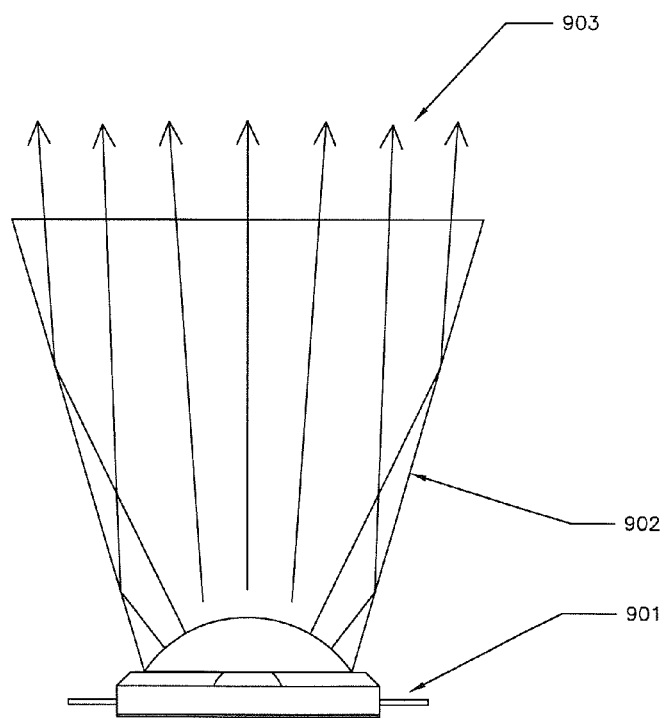
FIG. 9 shows a side view of the 50-chip LED array of the present invention, using another embodiment of a reflector, providing a narrow beam pattern.

In order to provide for a variety of beam patterns, the present invention incorporates a reflector element as a secondary optic. As with the lens element, the small size of the LED array allows a single reflector element to be used, to shape the light output of many LED chips. In FIG. 4A, the reflector (4A01) is attached to a mounting plate (4A02), such that the reflector is placed just above the LED array (4A03), with the circular opening at the base of the reflector being flush with the base of the ball lens of the LED array. The shape of the reflector element may be varied to create a variety of beam patterns, with a variety of beam angles. FIGS. 8 and 9 show side views of the 50-chip LED array (801 and 901), with two embodiments of reflectors. In FIG. 8, the reflector (802) is shaped to provide a wider beam angle, as illustrated with the representative light rays (803). In FIG. 9, the reflector (902) is shaped to provide a narrow beam angle, as illustrated with the representative light rays (903). Wide beam angles (such as in a typical "flood light") will allow a single LED grow light to illuminate a relatively large area, although the intensity of the light output will diminish more rapidly as the distance from the light source increases. Alternatively, a narrow beam angle (such as in a typical "spot light") will illuminate a relatively smaller area, but the intensity of the light output will diminish more slowly as the distance from the light source increases. A narrow beam angle will therefore result in more uniform illumination between the upper foliage and lower foliage of taller plants.

Figure 10A:
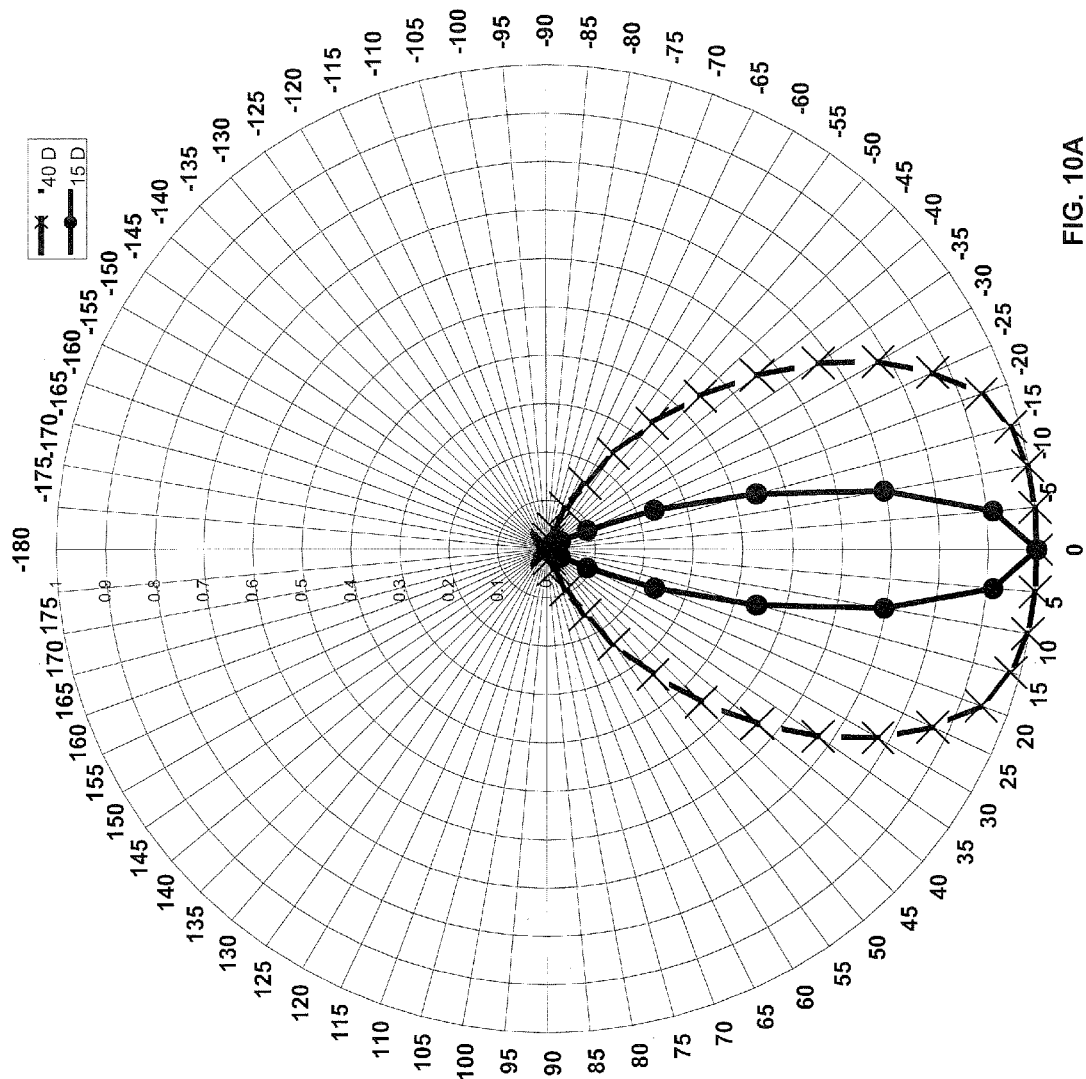
FIGS. 10A and 10B show the spatial light distribution profiles of two embodiments of the reflector used in the present invention as a secondary optic, one providing a wide beam pattern, and the other providing a narrow beam pattern.
Figure 10B:
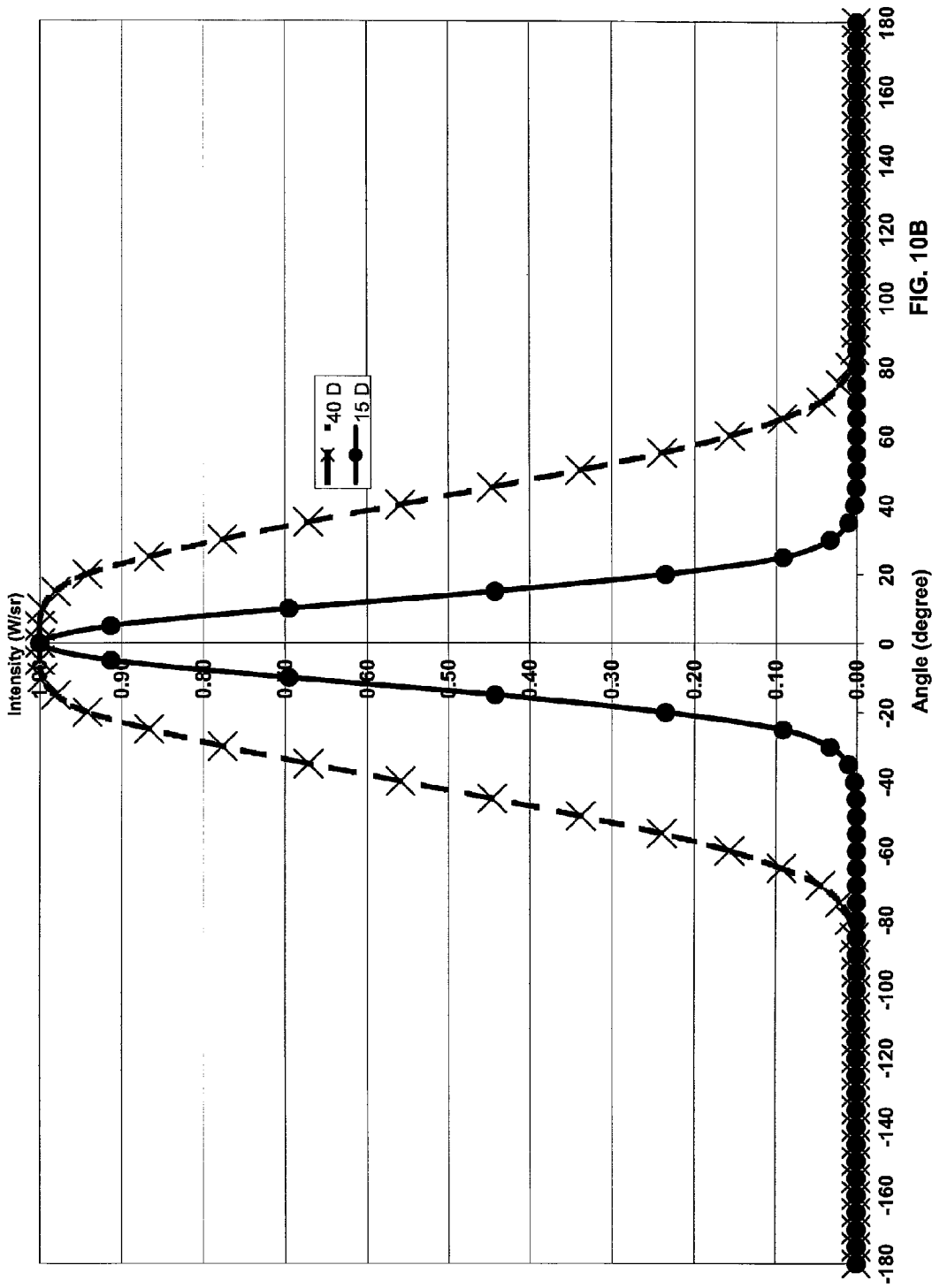
Figure 10C:
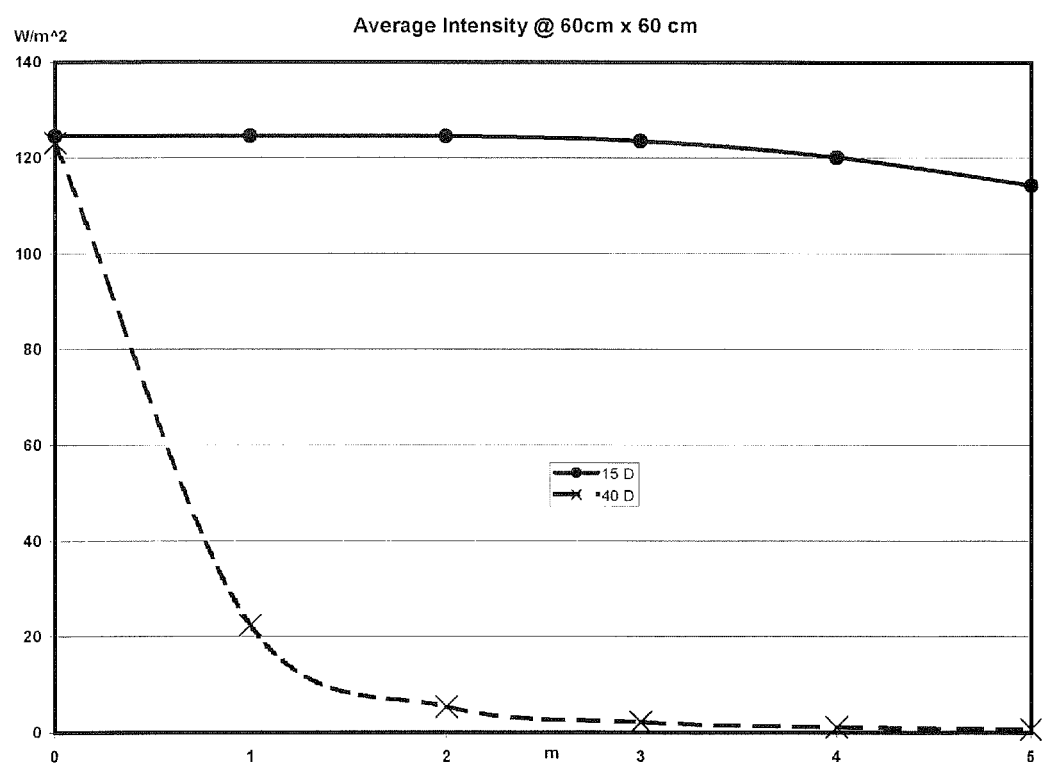
FIG. 10C shows a comparison of the light intensity of the two beam patterns, as a function of distance from the light source.

FIGS. 10A and 10B show representative light distribution plots for two different reflector embodiments, one designed for a wider beam angle (approximately 40 degrees), and one designed for a narrower beam angle (approximately 15 degrees). Note that the beam in both cases includes all of the wavelengths that are being emitted by the multiple LED chips of the LED array. The combination of the lens as primary optic, and the reflector as secondary optic, provides good mixing of the multiple wavelengths, ensuring uniform spectral content within the beam. FIG. 10C shows how the light intensity (expressed in Watts per $cm^2$) of these two beam patterns decreases as a function of distance from the light source. As can be seen in the figure, the light intensity of the narrow beam decreases very slowly as the distance from the light source increases. This results in a more even distribution of light intensity between the lower and upper foliage of a tall plant, at the expense of a smaller area of illumination.

Figure 5C:
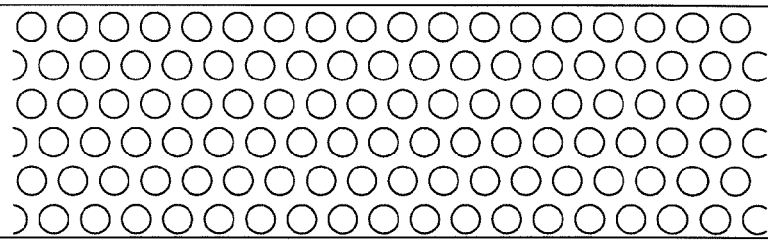
FIG. 5C is a representation of one embodiment of the metal circuit board, or MCB substrate, used in the densely-packed LED arrays of the present invention, shown in cross-section.
Figure 5C:
Figure 5C:
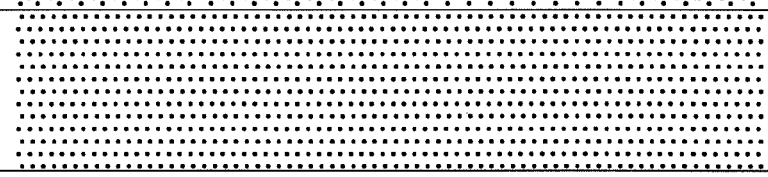

Due to the large number of LED chips in the LED array, significant amounts of heat are generated. As discussed above, the LED array incorporates a metal circuit board as its substrate, which has a high thermal conductivity and very low electrical conductivity (i.e. highly electrically insulative). This MCB is a supporting structure shown in FIGS. 5A and 5B, without detail (comprising non-porous aluminum oxide layer and a porous aluminum oxide layer in elements 5A03 and 5B03, respectively). The array of LED chips is bonded to this supporting structure. FIG. 5C shows a cross-section view of one embodiment of the MCB substrate used in the LED arrays. From bottom to top, the layers of this embodiment include an aluminum alloy sheet plate (5C01), a non-porous anodized aluminum oxide layer (5C02), a transition layer (5C03) which represents a mixed phase of non-porous and porous oxides, a porous anodized aluminum oxide layer (5C04), and a thin dialectric layer (5C05). The resulting MCB substrate provides excellent thermal conductivity from the top surface to the bottom surface, while maintaining a high degree of electrical isolation (i.e. low electrical conductivity, or high insulation). The MCB of the present invention is described in more detail, including the specific purposes of the layers shown in FIG. 5C, in U.S. patent application Ser. No. 12/145,395, entitled "A LIGHT EMITTING DIODE SUBMOUNT WITH HIGH THERMAL CONDUCTIVITY FOR HIGH POWER OPERATION" (Ye, et al.). The MCB of the LED array serves to carry the heat of the LEDs to the base of the array.

Figure 5D:
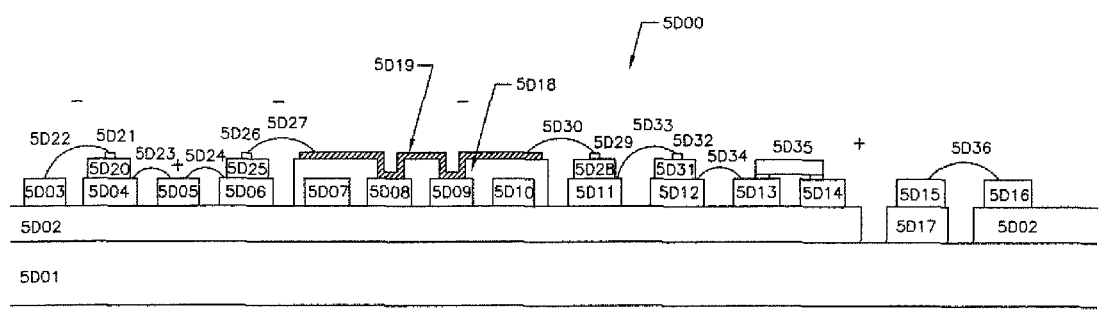
FIG. 5D is a representation of one embodiment of the metal circuit board, or MCB substrate, showing the connections to LED chips.

FIG. 5D shows additional details of how LED chips are connected to the MCB substrate of the present invention. To implement the dense submount circuitry required by a multichannel LED lighting module, this embodiment uses both single-level and integrated double-level metallization. FIG. 5D shows a generalized cross-section drawing of the single-level and double-level circuitry. The anodized oxide film 5D02 is grown on the polished aluminum alloy sheet plate 5D01. The high-density circuit electrodes/lines 5D03 to 5D16 are fabricated using a conventional lithography method. The metal layers of these circuit electrodes consist of adhesion, buffer, barrier and bonding layers. The spacing between circuit lines and bonding pads, between bonding pads and adjacent bonding pads, and between circuit lines and adjacent circuit lines, are less than 100 microns in some circuit implementations. The anodized oxide layer 5D17 is isolated from the bulk oxide layer 5D02 by using conventional lithography and etching methods. By implementing a comb pattern in the metal layer 5D15 and the oxide layer 5D17, integrated capacitors can be formed on this circuit. To electrically insulate circuit lines 5D07 and 5D10, the second dielectric insulator layer 5D18, which is formed of a silicon oxide film deposited by a PECVD process, provides an insulating cover over those circuit lines. The circuit lines 5D07 and 5D10 are linked to the other two-channel LED circuits. To contact the second metal layer to the first metal layer, the dielectric insulator 5D18 is opened by lithography and etching methods on the top of the first layer circuit electrodes 5D08 and 5D09. The second metal layer 5D19 is patterned by lithography method and metallized by a physical vapor deposition method.

The LED chips 5D20, 5D25, 5D28 and 5D31 are attached onto the circuit electrodes 5D04, 5D06, 5D11 and 5D12, respectively. The gold bonding wire 5D22 is connected between cathode circuit electrode 5D03 and negative electrode pad 5D21 of LED chip 5D20. The gold bonding wire 5D27 is connected between the second circuit electrode 5D19 and negative electrode pad 5D26 of LED chip 5D25. The gold bonding wire 5D23 is connected between circuit electrode 5D04 and common anode electrode 5D05. And the gold bonding wire 5D24 is connected between circuit electrode 5D06 and common anode electrode 5D05. From electrode 5D03 to electrode 5D27, the embodiment is configured as a parallel circuit, to demonstrate the feasibility of implementing parallel connections of LED chips.

The gold bonding wire 5D30 is connected between the second circuit electrode 5D19 and negative circuit electrode 5D29 of LED chip 5D28. The gold bonding wire 5D33 is connected between positive circuit electrode 5D11 and negative electrode pad 5D32 of LED chip 5D31. The gold bonding wire 5D34 is connected between two circuit electrodes 5D12 and 5D13. The chip resistor or chip inductor 5D35 is bumped onto the circuit electrodes 5D13 and 5D14. The gold bonding wire 5D36 is connected between the integrated capacitor 5D15 and circuit electrodes 5D16. From anode circuit electrode 5D14 to negative metal layer 5D19, the embodiment is configured as a series circuit, with a chip resistor or inductor and an integrated capacitor available for other circuit functions. Overall, the integrated double-level submount circuit could incorporate multiple active components such as LED chips and photodiodes, or passive components such as chip resistors, chip inductors, thermistors, or integrated capacitors.

In FIG. 4A (and also in FIG. 4B), a two-stage heat sink is shown, consisting of two elements. A traditional finned heat sink (4A05 and 4B05) is used, along with a "vapor chamber" element (4A04 and 4B04). In one embodiment, the vapor chamber is a commercially-available part, such as the Vapor Chamber thermal device from the Microloops Corporation. Similar products, such as the Celsia NanoSpreader vapor cooler from Intel Corporation, may be used in other embodiments. In both cases, the phase change of a liquid that is contained within the vapor chamber element (into vapor) is used to achieve high thermal conductivity and transfer of heat from the top surface of the vapor chamber, to its bottom surface. The vapor chamber element also serves to spread the heat from the bottom of the LED array, to the much larger area of the bottom surface of the vapor chamber element. This maximizes the thermal effectiveness of the finned heat sink (4A05 and 4B05), and allows the use of a larger finned heat sink, with top surface area that is significantly larger than the bottom surface of the LED array. In some embodiments of the present invention, heat dissipation from the finned heat sink (4A05 and 4B05) is aided by use of a small electric fan.

Figure 11:
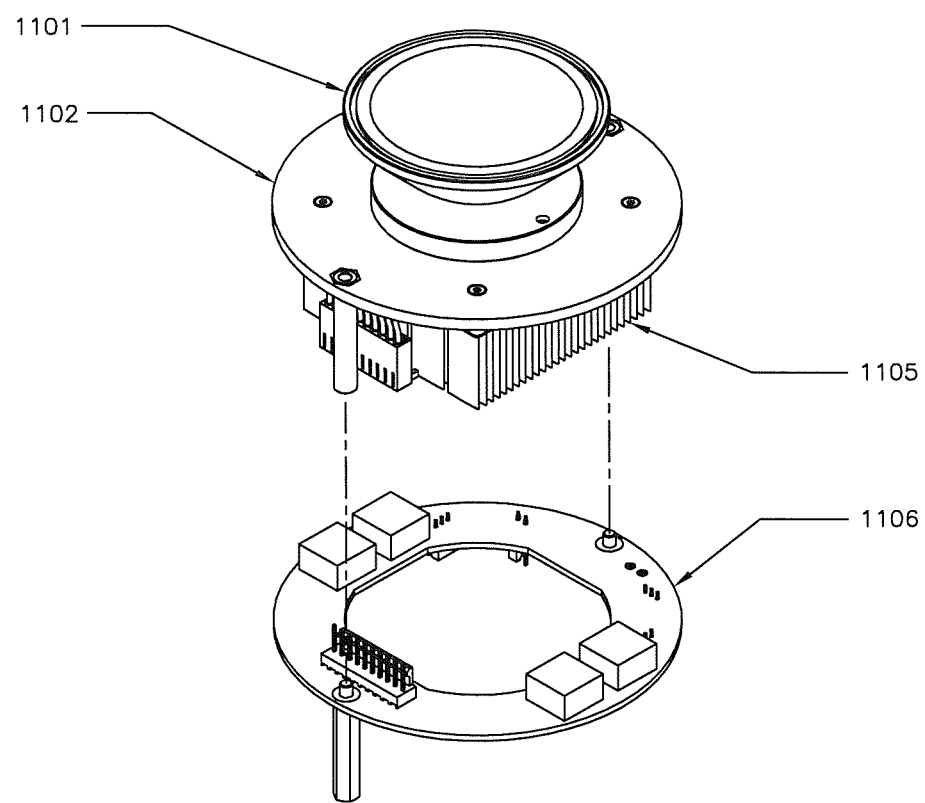
FIG. 11 shows a portion of one embodiment of the present invention, consisting of a 50-chip LED array, reflector, heat sink, and electronic printed circuit board.
Figure 12A:
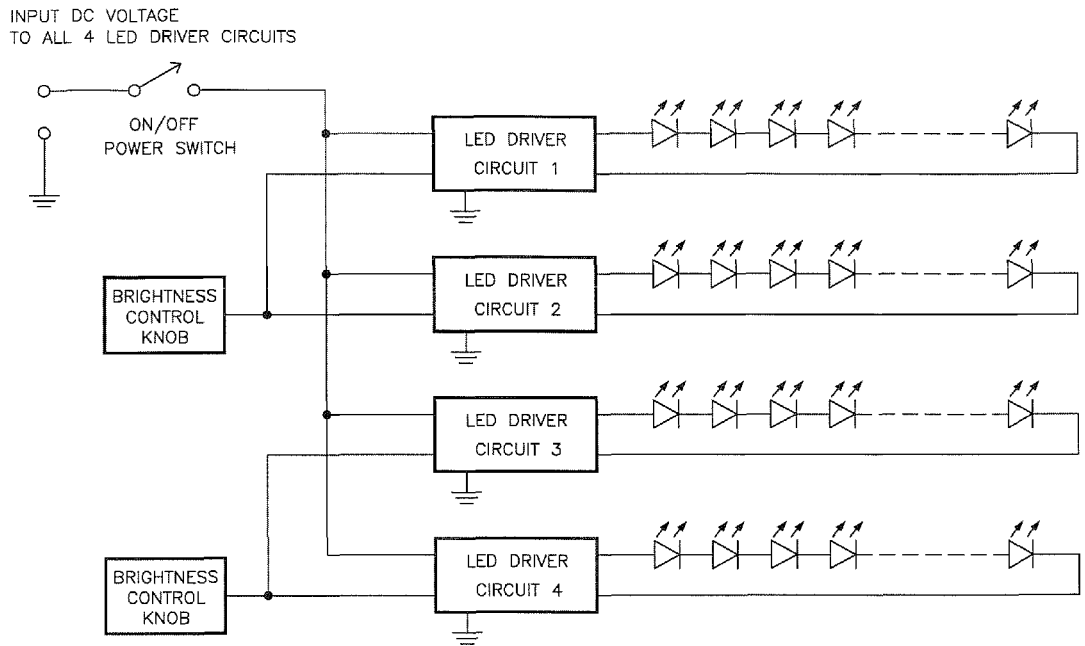
FIG. 12A shows a block diagram of the control electronics of one embodiment of the present invention.

It is common practice to power or drive strings of LED chips using driver circuits that convert a DC voltage to a "constant" DC current. In one embodiment of the present invention, as shown in FIG. 11, an electronic printed circuit board (1106) is used, containing four LED driver circuits. FIG. 12A shows a functional block diagram of one embodiment of the control circuit. Each LED driver circuit converts an input DC voltage to a constant DC current, which is fed to one of the LED strings of the LED array. In one embodiment, the current level for each string is fixed, and is set to a predetermined level of DC current. In other embodiments, one or more control knobs can be used to vary the DC current that is fed to each LED string. A single control knob may be used to vary the DC current to all four LED strings in unison, thereby serving as a simple dimming or brightness control.

Figure 13:
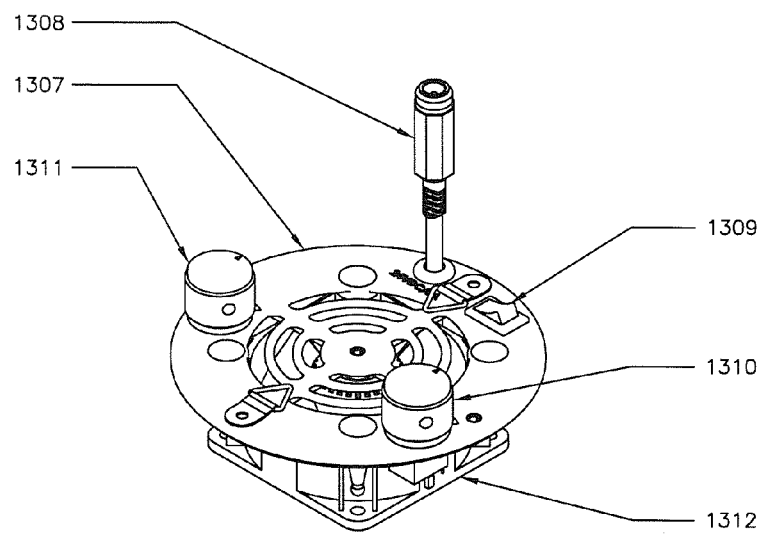
FIG. 13 shows the end panel of one embodiment of the present invention, including electrical power connector, on/off switch, control knobs, and electric cooling fan.

In other embodiments, multiple knobs may be used to independently vary the DC current of individual LED strings, thereby controlling both the overall brightness of the LED grow light, as well as its spectral content. In one such embodiment, as shown in FIG. 13, one control knob (1310) is used to vary the brightness of one or more red LED strings, while a second knob (1311) provides independent control of the brightness of one or more blue LED strings, thereby allowing a varying mix of red and blue wavelengths. A simple on/off switch (1309) is used to turn on or turn off the LED drive circuits. A standard power connector (1308) is used to bring in DC voltage from a commercially-available DC power supply. In one embodiment of the present invention, the input power is intended to be 24 Vdc. The current requirement of the power supply is dependent on the number and type of LED chips used in the LED array. In one embodiment, using a 50-chip LED array, the recommended power supply would provide 5 amps, at 24 Vdc.

Figure 12B:
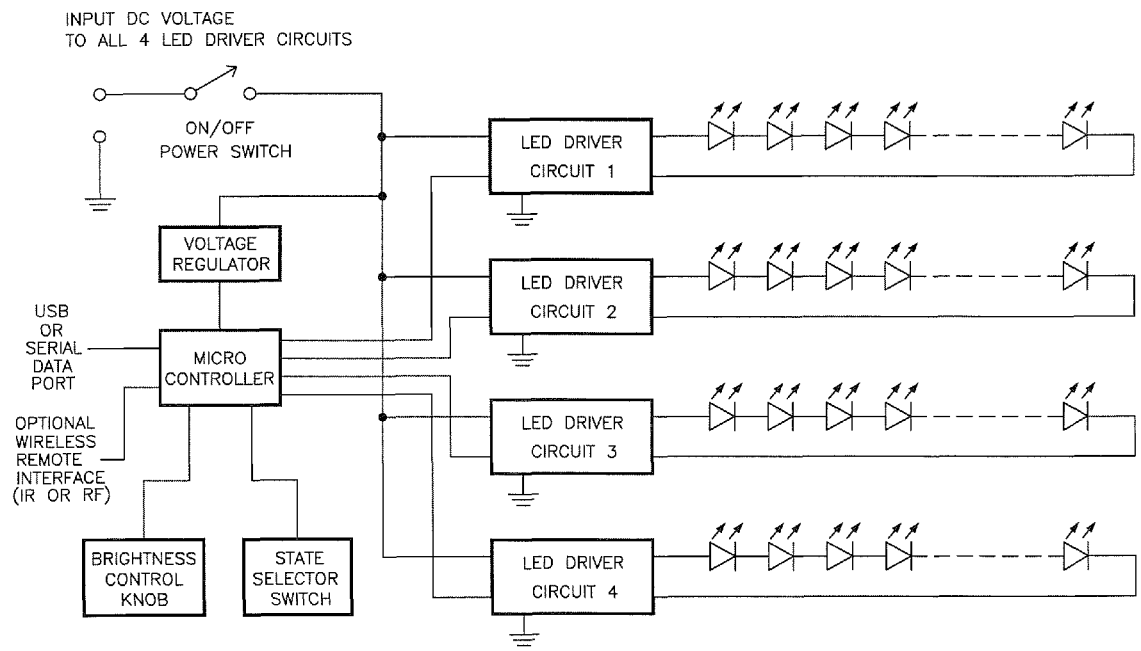
FIG. 12B shows a block diagram of the control electronics of another embodiment of the present invention, using a micro-controller for additional control flexibility.

FIG. 12B shows a block diagram of another embodiment of the control circuit of the present invention. In this embodiment, a micro-controller is used, to allow more sophisticated control of the light output from the multiple LED strings or channels of the LED array. In this embodiment, multiple states of light output can be pre-defined in the micro-controller's embedded software and internal memory, with different LED currents defined for each LED string or channel. This results in a different color mix or spectral content for each state. A selector switch is used to select one of the pre-defined, stored states. A brightness knob is used to control the overall brightness of the pre-defined "color". Using an LED array with different wavelengths of LED chips in the different LED strings or channels, it would be possible to pre-define light output states that were optimized for specific desired effects related to plant growth, propagation, or prevention of specific undesirable plant effects. Examples of these desired effects are maximum vegetation growth, flowering, developing of fruit or seeds, etc. or minimal plant growth while maintaining plant health (e.g. for flowering plants).

The control circuit shown in FIG. 12B includes a USB interface or other serial data port, which could be used for directly controlling the LED grow light. This port could also be used for downloading new firmware or embedded software to the micro-controller, including the downloading of new pre-defined light output states. An optional wireless remote interface is also shown, using either an infrared (IR) or radio frequency (RF) remote control. This feature would allow a user of the LED grow light to select light output states (including turning the LED grow light ON or OFF) from a short distance away from the LED grow light. This feature will be useful in situations where the LED grow lights are not easily accessible or reachable for manual control.

If the micro-controller or the overall control circuit of FIG. 12B is equipped with a real-time clock, then it is also possible to program different spectral content for different times of the day, or even to vary the spectral content by date or season. One purpose for this feature would be to better replicate the spectral content of natural sunlight. The programming capability could also be used to potentially create an artificial acceleration of time, via a shorter artificial "day". The programming capability could also be used for potential manipulation of the growing season, and for artificial stimulation or triggering of various seasonal effects in plant growth and propagation.

There has been some research into plant growth that indicates that a light source that is pulsed on and off, may be more effective than a steady-state light of the same average power, due to the nature of photosynthesis processes, if the frequency and duty cycle of the light pulses is appropriate for the plants being grown. For example, a 10 times brighter light source that is pulsed with a 10% duty cycle, may result in faster plant growth (or other beneficial effects), compared to a steady light of the original brightness. This is discussed in prior-art U.S. Pat. No. 5,012,609 (Ignatius et al.). The control electronics of the present invention (either of the embodiments shown in FIGS. 12A and 12B) can easily be configured to implement pulsed operation, if desired. Note that in this case, the pulsing would be at some fixed duty cycle. Dimming and brightness control would still be achieved by changing the current level during each fixed-length pulse, rather than by varying the width or duty cycle of the light pulse.

Figure 14:
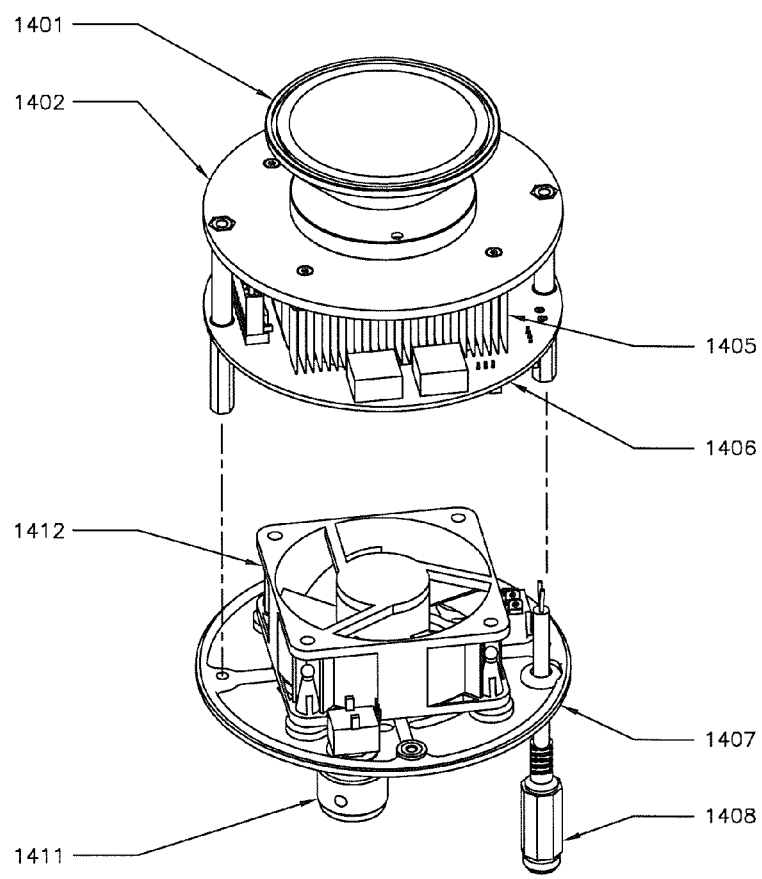
FIG. 14 shows the major sub-assemblies of one embodiment of the present invention.

In one embodiment of the present invention, as shown in FIG. 14, a small electric fan (1412) is mounted to the plate (1407) that contains the electrical power connector (1408), on/off switch (not visible), and control knobs (one visible—1411). This sub-assembly is then attached to a sub-assembly that includes the LED array, reflector (1401), heat sink (1405), and LED driver circuit board (1406). FIG. 15 shows the outer housing (1515) of the LED grow light, as well as a gasket (1513) and transparent reflector cover plate (1514). The cover plate (1514) may be a simple piece of glass or other optically transparent material, and serves to protect the surface of the reflector (1501), as well as the LED array and lens that sit at the base of the reflector. In one embodiment of the present invention, a diffusing element may be used as the cover plate (1514), in order to provide an even higher degree of color mixing. Two views of a fully-assembled embodiment of the present invention are shown in FIG. 16.

Figure 17:
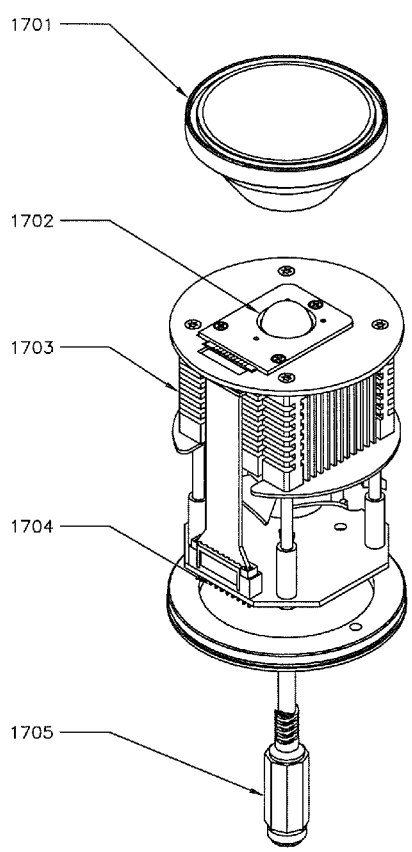
FIG. 17 shows the major sub-assemblies of a smaller embodiment of the present invention, using a 21-chip LED array.
Figure 18A:
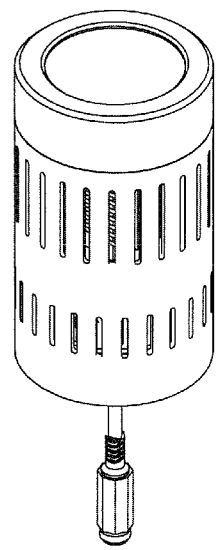
FIGS. 18A and 18B show the fully-assembled form of the smaller embodiment of the present invention.
Figure 18B:
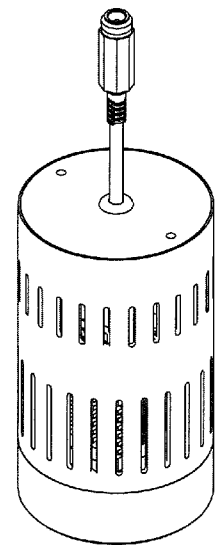

FIGS. 4A, 4B, 11, 13, 14, 15, 16A, and 16B depict an embodiment of the present invention that uses a 50-chip LED array. In this embodiment, the approximate length of the LED grow light body is in the range of six to eight inches, with an approximate diameter of six inches, whereas prior-art LED grow lights with a similar light output would have length and width dimensions in the range of two to four feet. When using a 21-chip array, the smaller array size and lower total thermal load enable the use of an even smaller heat sink, fan, and mechanical housing, although in most respects the construction of the 21-chip version is very similar to the 50-chip version. An embodiment of the present invention using the 21-chip LED array is shown in FIG. 17, and in the two views of FIGS. 18A and 18B. FIG. 17 shows an exploded view of this embodiment of the present invention, including a reflector (1701), the 21-chip LED array (1702), a heat sink (1703), an electronic control board (1704) with electrical connector to the LED array, and a power cord with connector (1705) for the application of DC voltage from an appropriate power supply. Two views of the complete 21-chip LED grow light are shown in FIGS. 18A and 18B. The diameter of this 21-chip embodiment of the LED grow light is approximately three inches.

The LED grow light of the present invention provides multiple flexible mounting arrangements, in order to effectively direct the light output of one or more LED grow lights onto the plants in a growing area. Multiple mounting options are desirable, since the number, size, shape, and dimensions of the plants in a plant growing area may vary considerably, and also change over time, as the plants grow. Optimal use of the LED grow lights may therefore require the lights to be placed in a variety of positions and orientations. Since particular wavelengths of light may be used to stimulate specific effects of plant growth, flowering, seeding, and fruit/vegetable production, the ability to rapidly and easily re-position LED grow lights provides several advantages to the user.

Figure 19A:
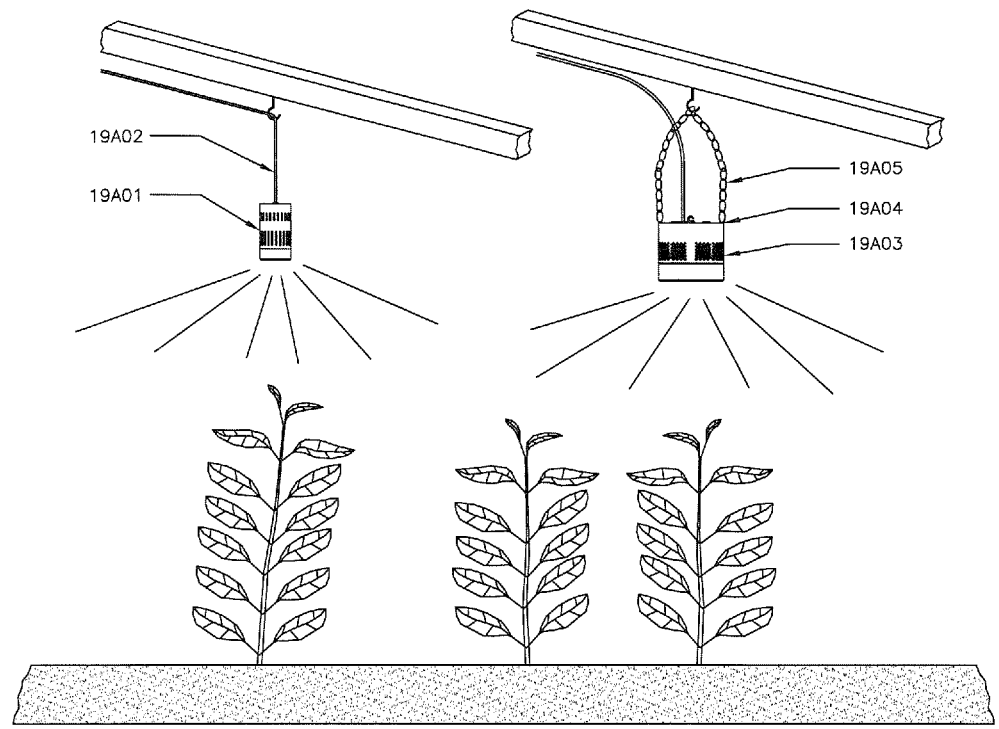
FIGS. 19A and 19B show three embodiments of the present invention, using hanging mounts.

FIG. 19A shows two embodiments of the present invention, each using a single LED array, used with basic hanging mounts. For smaller versions of the LED grow light, such as the 21-chip version (19A01), it is possible to simply hang the LED grow light by its power cord (19A02), as the light weight of the grow light does not over-stress the power cord. The LED grow light (19A03) may also be hung by a separate cord or light-weight chain (19A05), using mounting tabs (19A04). The length of the hanging cord or chain can be varied as the plants grow. Although the brightness of the LED grow lights can be adjusted via their control knobs (for embodiments of the present invention that include this feature), it is also possible to adjust the intensity of the light that hits the plants, by adjusting the distance of the grow light from the plants. The small size of both the 21-chip and 50-chip embodiments of the LED grow light enables their use as supplemental grow lights, when used in conjunction with natural sunlight, as the LED grow lights do not block overhead sunlight, nor shade the plants in any significant way. This represents a significant advantage over the prior art grow lights.

Figure 19B:
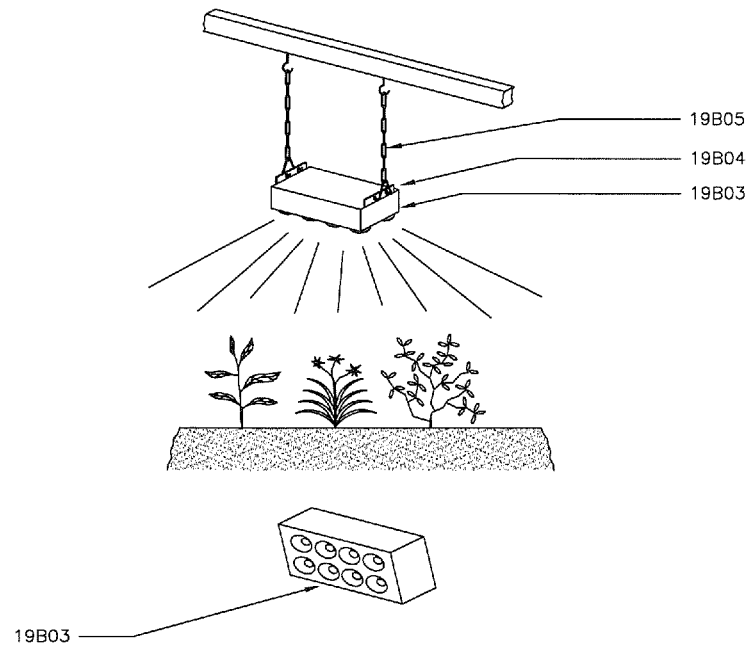

FIG. 19B shows a third embodiment of the present invention, using multiple LED array modules in a single housing, as shown in FIG. 4C. The somewhat larger, panel-form LED grow light (19B03) may be hung using chains (19B05), attached to the LED grow light using mounting tabs or brackets (19B04). Although this embodiment is somewhat larger than the embodiments shown in FIG. 19A, it is capable of providing very high light output, as each of the LED array modules contains a large number of LED chips.

Figure 20:
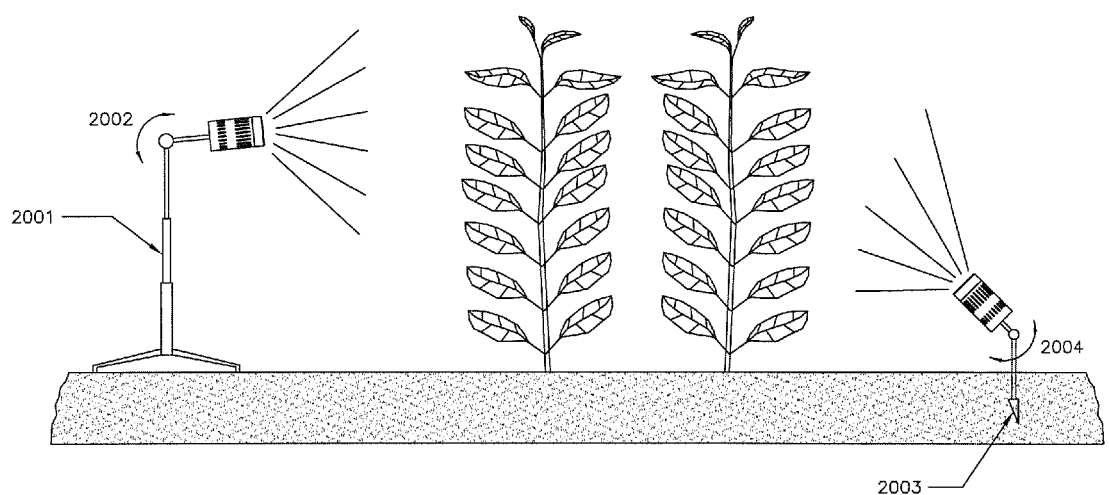
FIG. 20 shows two embodiments of the present invention, using a telescoping stand mount, and a stake mount.

In some cases it is useful to illuminate plants from either the side, or from below. FIG. 20 shows two embodiments of the present invention that provide mounting options that facilitate side- or bottom-lighting of plants. In one embodiment, a telescoping stand mount (2001), with a flexible elbow (2002), is used to raise the LED grow light a varying distance off of the ground, for side-lighting or bottom-lighting of plant foliage. In another embodiment, the LED grow light is mounted on a stake mount (2003), with flexible elbow (2004), that is simply inserted into the soil or dirt underneath or adjacent to the plants. Again, the large physical size of prior-art grow lights does not allow them to be used in this way, for side- and bottom-lighting of plants.

Figure 21:
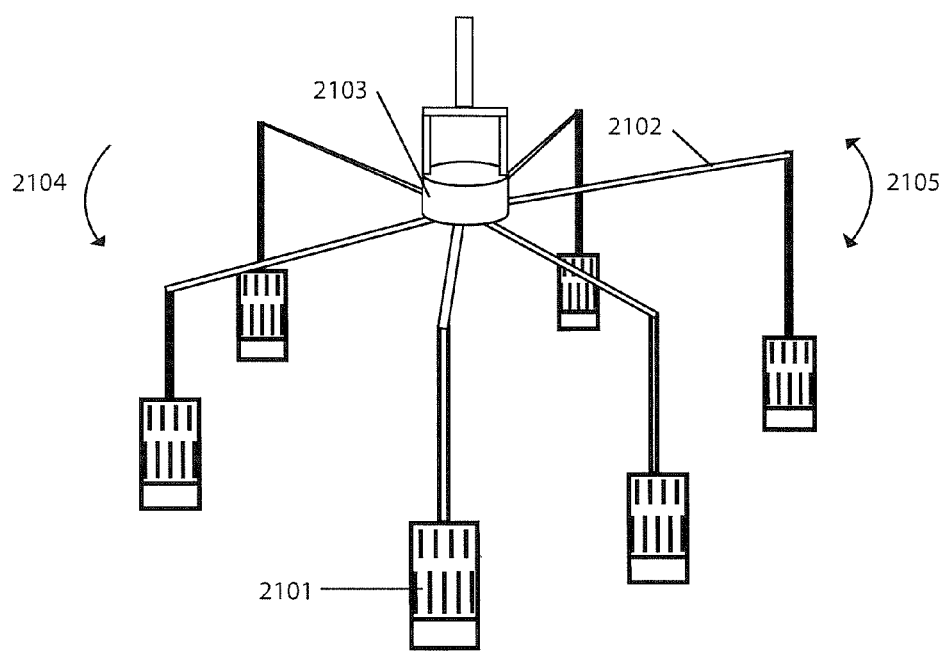
FIG. 21 shows embodiments of the present invention, using a motorized rack mount.
Figure 21:
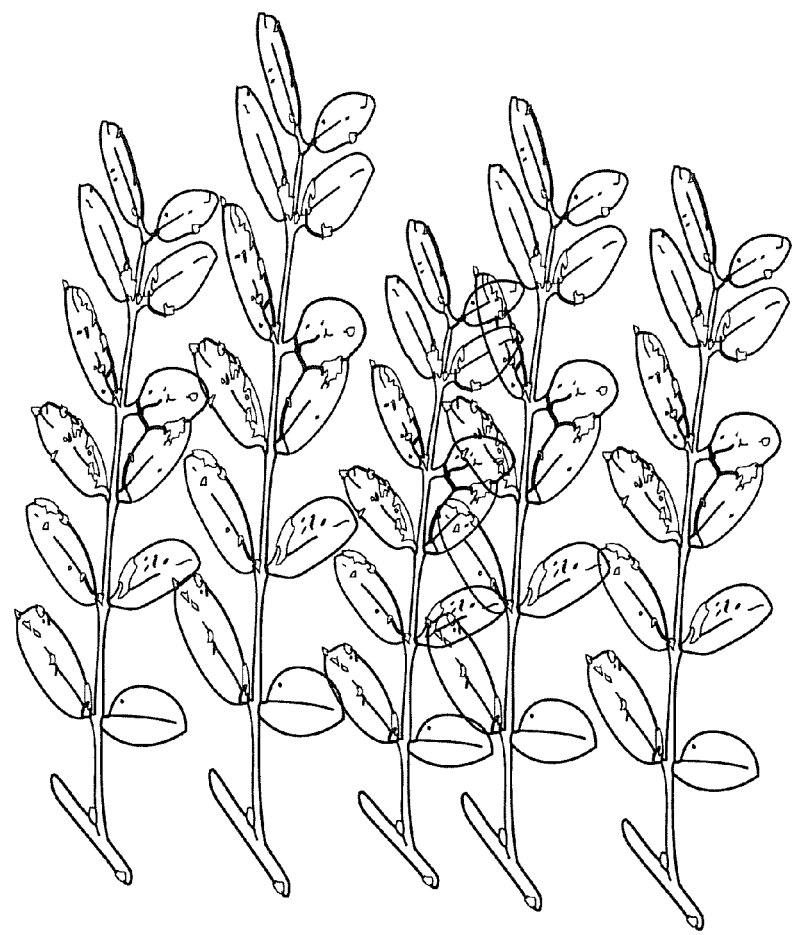

In order to provide sufficient light output for larger growing areas, it will often be useful to mount multiple LED grow lights of the present invention on an overhead rack. Such a rack can be raised, lowered, and positioned such that the area and intensity of illumination is appropriate for the plant growing area. In some cases, it will be desirable to use grow lamps with differing spectral content. In order to provide an evenly-mixed distribution of light from multiple LED grow lights that are suspended over a larger plant growing area, a motorized mounting rack is used. One embodiment of the present invention is shown in FIG. 21. In this embodiment, multiple LED grow lights (2101), possibly with differing spectral content, are mounted on the rack (2102), on the ends of the "spokes" of the rack. The rack is equipped with a small electric motor (2103), so that the multiple LED grow lights are slowly rotated above the plant growing area, so that all the plants of the growing area receive light from all of the LED grow lights. In one embodiment of the motorized mounting rack, the rack rotates continuously (2104). In another embodiment, the rack oscillates back and forth (2105), which simplifies the management and "dressing" of power cords. Although not shown in FIG. 21, other forms of motion may be implemented using suitable mounting racks and motor configurations, including various directions and orientations of linear or rectilinear motion. Suitable mounting racks and motor configurations may also be used to achieved a combination of the above described types of motion.

While the invention has been described above by reference to various embodiments, it will be understood that changes and modifications may be made without departing from the scope of the invention, which is to be defined only by the appended claims and their equivalents.

What is claimed is:

1. A compact LED grow light apparatus, comprising:
an array of multiple LED chips without individual packaging, wherein the LED chips are distributed laterally over an area, said LED chips having light emitting surfaces for emitting light of different colors in directions transverse to said area, wherein the dimensions of the area do not exceed 25 mm, said array configured as multiple strings of LEDs, each of the strings containing multiple LED chips, the LED chips in at least a first one of the strings emitting red light of different wavelengths and the LED chips in at least a second one of the strings emitting blue light of different wavelengths, said apparatus further comprising a plurality of drivers, a first one of said drivers driving the first string and a second one of said drivers driving the second string, so that said drivers control the intensities and spectral range of light emitted by said apparatus;
a single optical lens adjacent to the light emitting surfaces of the LED chips in said array that collects and directs light of different colors emitted by the LED chips of the array towards plants to enhance their growth; and
a single reflector surrounding said array reflecting light emitted by the LED chips of the array towards plants to enhance their growth.

2. The apparatus of claim 1, wherein adjacent chips of said array of multiple LED chips are separated by less than about 0.2 mm.

3. The apparatus of claim 1, said optical lens has a principal plane, wherein dimensions of said optical lens along said principal plane are less than about 30 mm.

4. The apparatus of claim 1, said array comprising LED chips that emit light of at least two different wavelengths of red light and at least two different wavelengths of blue light from different portions of said area, wherein the light emitted at each of the at least two different wavelengths from the array is evenly distributed, when the objects being illuminated by the array are at a distance of less than about 6 feet from the array.

5. The apparatus of claim 4, wherein the light emitted at each of the different wavelengths from the array is evenly distributed at distances of less than three feet.

6. The apparatus of claim 4, wherein the light emitted at each of the different wavelengths from the array is evenly distributed at distances of less than one foot.

7. The apparatus of claim 1, further comprising user controls that each enables users to control a corresponding one of said drivers, so that users are enabled to control individually intensities to be emitted by the different strings of the LED chips, and to control the intensities and spectral range of light emitted by said apparatus.

8. The apparatus of claim 1, further comprising a controller for controlling the plurality of drivers to enable light of one intensity and spectral content to be emitted according to one state of a plurality of different pre-defined user-selectable light output states.

9. The apparatus of claim 8, further comprising a selector switch that enables a user to select a desired state from said plurality of pre-defined user-selectable light output states.

10. The apparatus of claim 9, wherein said selector switch is operable by wireless means.

11. The apparatus of claim 8, said plurality of pre-defined user-selectable light output states including states of light output optimized for specific desired effects related to plant growth, propagation, or prevention of specific undesirable plant effects.

12. The apparatus of claim 11, said specific desired effects including maximum flowering or development of fruits or seeds.

13. The apparatus of claim 11, said specific desired effects including minimal plant growth while maintaining plant health.

14. The apparatus of claim 8, further comprising a USB interface through which pre-defined user-selectable light output states are loaded into said controller.

15. The apparatus of claim 8, further comprising a real time clock wherein said controller is programmable to select from said plurality of pre-defined user-selectable light output states based on time of day, date or growing season based on time of said real time clock.

16. The apparatus of claim 1, further comprising a vapor chamber and a heat sink removing heat from all of the multiple LED chips.

17. The apparatus of claim 1, further comprising one or more drivers supplying current pulses to the LED chips.

18. The apparatus of claim 1, further comprising a supporting structure comprising at least two different layers of anodized aluminum oxide, including a porous anodized aluminum oxide layer and a non-porous anodized aluminum oxide layer; said array of LED chips bonded to said supporting structure so that said supporting structure has a thermal conductivity of metal, provides routing of electrical traces to the LED strings and provide electrical isolation between the LED strings.

19. The apparatus of claim 1, further comprising a hanging mount for supporting the array, the optical lens and reflector that enable the supply of light from above the plants.

20. The apparatus of claim 1, further comprising additional arrays of multiple LED chips without individual packaging, wherein the LED chips in each additional array are distributed laterally over a corresponding area, said LED chips in each additional array having light emitting surfaces for emitting light in directions transverse to said corresponding area, wherein the dimensions of the corresponding area in each additional array do not exceed 25 mm;

a plurality of additional optical lenses, each of the lenses adjacent to the light emitting surfaces of the LED chips of a corresponding one of said additional arrays, said additional optical lenses collecting and directing light emitted by the LED chips of such additional arrays towards plants to enhance their growth; and a plurality of additional reflectors, each of the additional reflectors surrounding a corresponding one of said additional arrays, reflecting light emitted by the LED chips of the additional arrays towards plants to enhance their growth.

21. The apparatus of claim 1, wherein a spectrum of the light of different colors emitted by the LED chips of the array is optimized for specific effects related to plants.

22. The apparatus of claim 21, wherein the light of different colors emitted by the LED chips of the array is such that light and heat energy that is emitted by the LED chips of the array and that is not useful for plant growth is minimized.

23. The apparatus of claim 21, wherein the spectrum of light of different colors emitted by the LED chips of the array is such that green light emitted by the LED chips of the array is minimized.

24. The apparatus of claim 1, said array configured as four strings of LEDs, each of the strings containing multiple LED chips, said apparatus further comprising four drivers, each of said four drivers driving a corresponding one of the four strings, so that said drivers control the intensities and spectral range of light emitted by said apparatus.

25. The apparatus of claim 1, further comprising a supporting structure; said array of LED chips bonded to said supporting structure, said apparatus further comprising a plurality of layers of electrically conductive material supported at different heights by the supporting structure and connected to the array of LED chips, and an insulating layer separating the plurality of layers of electrically conductive material.

26. The apparatus of claim 1, wherein at least some of the LED chips in the array are located near edges of the supporting structure and at least some of the remaining LED chips in the array are located away from the edges of the supporting structure, said apparatus further comprising a supporting structure bonded to said array of LED chips and one or more layers of electrically conductive material connected to the array of LED chips, a first one of said one or more layers of electrically conductive material being connected to the LED chips located away from the edges of the supporting structure and not to the LED chips located near edges of the supporting structure.

27. A method for growing plants, comprising:

providing a compact LED grow light apparatus, which comprises:

an array of multiple LED chips without individual packaging, wherein the LED chips are distributed laterally over an area, said LED chips having light emitting surfaces for emitting light of different colors in directions transverse to said area, wherein the dimensions of the area do not exceed 25 mm, said array configured as multiple strings of LEDs, each of the strings containing multiple LED chips, the LED chips in at least a first one of the strings emitting red light of different wavelengths and the LED chips in at least a second one of the strings emitting blue light of different wavelengths;

driving the first string and the second string to control the intensities and spectral range of light emitted by said array;

collecting and directing light of said different colors emitted by the LED chips of the array towards plants to enhance their growth; and using a reflector surrounding said array to reflect light emitted by the LED chips of the array towards plants to enhance their growth.

* * * * *